US012722294B2

(12) United States Patent
Watanabe

(10) Patent No.: US 12,722,294 B2
(45) Date of Patent: Sep. 1, 2026

(54) DEVICE FOR GENERATING SIGNAL FOR WEAVING MOTION, CONTROL DEVICE, AND METHOD

(71) Applicant: Fanuc Corporation, Minamitsuru-gun (JP)

(72) Inventor: Daigo Watanabe, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 17 days.

(21) Appl. No.: 18/279,449

(22) PCT Filed: Mar. 23, 2022

(86) PCT No.: PCT/JP2022/013687
§ 371 (c)(1),
(2) Date: Aug. 30, 2023

(87) PCT Pub. No.: WO2022/210202
PCT Pub. Date: Oct. 6, 2022

(65) Prior Publication Data

US 2024/0131707 A1 Apr. 25, 2024
US 2024/0227185 A9 Jul. 11, 2024

(30) Foreign Application Priority Data

Mar. 30, 2021 (JP) ................................ 2021-058154

(51) Int. Cl.
*B25J 9/16* (2006.01)
*B23K 9/12* (2006.01)
(Continued)

(52) U.S. Cl.
CPC ............... *B25J 9/1664* (2013.01); *B23K 9/12* (2013.01); *B25J 11/005* (2013.01); *G05B 19/4155* (2013.01); *G05B 2219/45135* (2013.01)

(58) Field of Classification Search
None
See application file for complete search history.

(56) References Cited

U.S. PATENT DOCUMENTS 9,505,074 B2 11/2016 Wada et al.
2015/0290804 A1* 10/2015 Wada .................... B25J 9/1641 901/42

(Continued)

FOREIGN PATENT DOCUMENTS

CN 107990929 A 5/2018
CN 108732989 A 11/2018

(Continued)

OTHER PUBLICATIONS

English translation of KR-20110068495-A (wherein the paragraph numbering provided coincides with any relevant citations to this reference within the accompanying Office Action) (Year: 2011).*

(Continued)

*Primary Examiner* — Jason Holloway
*Assistant Examiner* — Bryant Tang
(74) *Attorney, Agent, or Firm* — BUCHANAN INGERSOLL & ROONEY PC

(57) ABSTRACT

A device includes an input reception unit that receives input of a parameter of a weaving signal, a signal generation unit that generates a weaving signal having the received parameter, a parameter acquisition unit that acquires, as a filtered parameter, the parameter of the weaving signal in a case where the weaving signal is subjected to filtering processing, a condition determination unit that determines whether or (Continued)

not the filtered parameter satisfies a predetermined condition, and a parameter adjustment unit that adjusts the received parameter if the filtered parameter is determined not to satisfy the predetermined condition. The signal generation unit generates a weaving signal having the parameter adjusted by the parameter adjustment unit.

10 Claims, 15 Drawing Sheets

(51) Int. Cl.
*B25J 11/00* (2006.01)
*G05B 19/4155* (2006.01)

(56) References Cited

U.S. PATENT DOCUMENTS

| | | | | |
|---|---|---|---|---|
| 2017/0266810 | A1* | 9/2017 | Linnell | B25J 9/1664 |
| 2018/0095640 | A1* | 4/2018 | Albright | B23K 9/1087 |
| 2018/0297164 | A1 | 10/2018 | Sonoda et al. | |
| 2019/0361467 | A1 | 11/2019 | Fujita et al. | |
| 2022/0269241 | A1 | 8/2022 | Sagasaki | |

FOREIGN PATENT DOCUMENTS

| | | | | |
|---|---|---|---|---|
| CN | 109257940 | A | | 1/2019 |
| JP | 61206571 | A | * | 9/1986 |
| JP | 2014083605 | A | | 5/2014 |
| JP | 2019028909 | A | | 2/2019 |
| JP | 2020097083 | A | | 6/2020 |
| KR | 20110068495 | A | * | 6/2011 |
| WO | 2020261581 | A1 | | 12/2020 |

OTHER PUBLICATIONS

English translation of JP-61206571-A (wherein the paragraph numbering provided coincides with any relevant citations to this reference within the accompanying Office Action) (Year: 1986).*

International Search Report and Written Opinion for International Application No. PCT/JP2022/013687, dated May 24, 2022, 5 pages.

* cited by examiner

DEVICE FOR GENERATING SIGNAL FOR WEAVING MOTION, CONTROL DEVICE, AND METHOD

CROSS REFERENCE TO RELATED APPLICATIONS

This is the U.S. National Phase application of PCT/JP2022/013687, filed Mar. 23, 2022, which claims priority to Japanese Patent Application No. 2021-058154, filed Mar. 30, 2021, the disclosures of each of these applications being incorporated herein by reference in their entireties for all purposes.

FIELD OF THE INVENTION

The present disclosure relates to a device, a control device, and a method for generating a signal for a weaving operation.

BACKGROUND OF THE INVENTION

Control devices that cause robots to execute a weaving operation are known (Patent Document 1, for example).

PATENT LITERATURE

Patent Document 1: JP 2014-83605 A

SUMMARY OF THE INVENTION

In the related art, a technology for enabling a robot to execute a weaving operation in an aspect desired by an operator while simplifying a work of teaching the robot the weaving operation has been required.

According to an aspect of the present disclosure, a device configured to generate a signal for a weaving operation of causing a robot to move a tool along a predetermined working path while swinging the tool in a direction intersecting the working path includes: an input reception section configured to receive an input of a parameter of a weaving signal for causing the robot to swing the tool; a signal generation section configured to generate the weaving signal having the parameter received by the input reception section; a parameter acquisition section configured to acquire, as a post-filtering parameter, the parameter of the weaving signal obtained when filtering for removing a high-frequency component is executed on the weaving signal generated by the signal generation section; a condition determination section configured to determine whether the post-filtering parameter satisfies a predetermined condition; and a parameter adjustment section configured to adjust the parameter received by the input reception section such that the condition is satisfied, when the condition determination section determines that the condition is not satisfied. The signal generation section is configured to generate the weaving signal having the parameter adjusted by the parameter adjustment section.

A method of generating a signal for a weaving operation of causing a robot to move a tool along a predetermined working path while swinging the tool in a direction intersecting the working path includes: receiving, by a processor, an input of a parameter of a weaving signal for causing the robot to swing the tool; generating, by a processor, the weaving signal having the received parameter; acquiring, by a processor, the parameter of the weaving signal obtained when filtering for removing a high-frequency component is executed on the generated weaving signal, as a post-filtering parameter; determining, by a processor, whether the post-filtering parameter satisfies a predetermined condition; adjusting, by a processor, the received parameter such that the condition is satisfied, when it is determined that the condition is not satisfied; and generating, by a processor, the weaving signal having the adjusted parameter.

According to the present disclosure, it is possible to automatically adjust a parameter of a weaving signal such that the weaving signal that satisfies a condition freely set by an operator can be generated. It is thus possible to enable a robot to execute a weaving operation in an aspect desired by the operator and to simplify a work of teaching the robot a desired weaving operation.

BRIEF DESCRIPTION OF DRAWINGS

FIG. 23 illustrates a waveform of a weaving signal for causing a robot to execute a weaving operation in the trajectory illustrated in FIG. 22.

DETAILED DESCRIPTION OF EMBODIMENTS OF THE INVENTION

Figure 1:
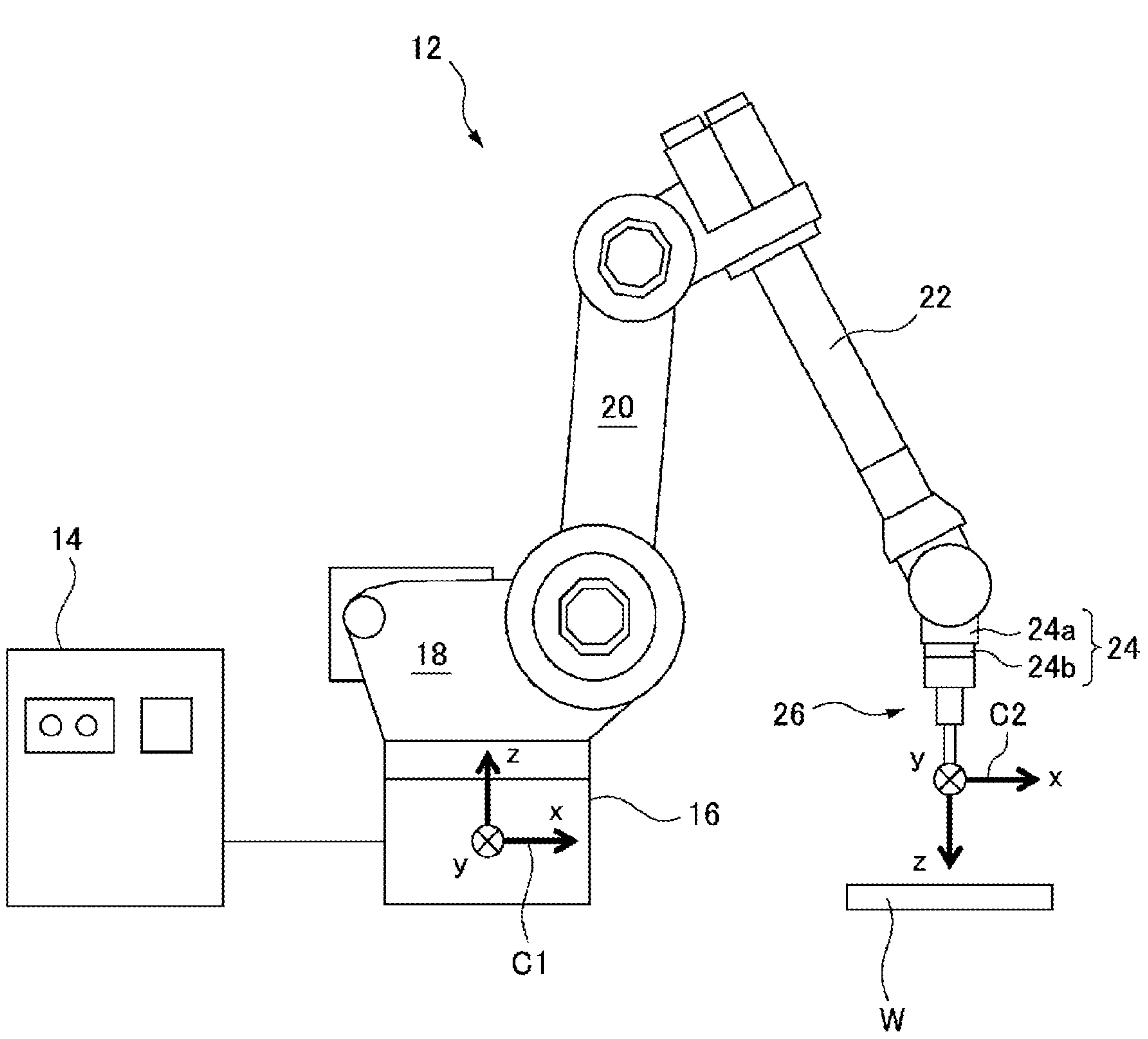
FIG. 1 is a diagram of a robot system according to an embodiment.

Hereinafter, embodiments of the present disclosure will be described in detail with reference to the drawings. In various embodiments described below, the same elements are designated by the same reference characters and/or numerals and duplicate description will be omitted. First, a robot system 10 according to one embodiment will be described with reference to FIGS. 1 and 2. The robot system 10 includes a robot 12 and a control device 14.

In the present embodiment, the robot 12 executes welding work on a workpiece W. Specifically, the robot 12 is a vertical articulated robot and has a robot base 16, a rotary barrel 18, a lower arm 20, an upper arm 22, a wrist 24, and a tool 26. The robot base 16 is fixed on a floor of a work cell. The rotary barrel 18 is provided on the robot base 16 and turnable about a vertical axis.

The lower arm 20 is provided on the rotary barrel 18 and turnable about a horizontal axis. The upper arm 22 is turnably provided at a distal end of the lower arm section 20. The wrist 24 includes a wrist base 24*a* provided at a front end portion of the upper arm section 22 such that it is turnable about two axes that perpendicularly intersect each other and a wrist flange 24*b* that is turnably provided at the wrist base 24*a*.

The tool 26 is detachably attached to the wrist flange 24*b*. In the present embodiment, the tool 26 is a welding torch, causes electrical discharge between the tool 26 and the workpiece W in response to a command from the control device 14, causes a welding wire fed from a wire material feeding device (not illustrated) to melt, and welds the workpiece W. Note that the tool 26 may be a laser working head that emits a laser beam, causes the welding wire to melt with the laser beam, and welds the workpiece W.

A plurality of servomotors 28 (FIG. 2) are built into the robot base 16, the rotary barrel 18, the lower arm 20, the upper arm 22, and the wrist 24, respectively. These servomotors 28 cause each movable element (i.e., the rotary barrel 18, the lower arm 20, the upper arm 22, the wrist 24, and the wrist flange 24*b*) of the robot 12 to turn in response to a command from the control device 14 and thereby cause the tool 26 to move.

Figure 2:
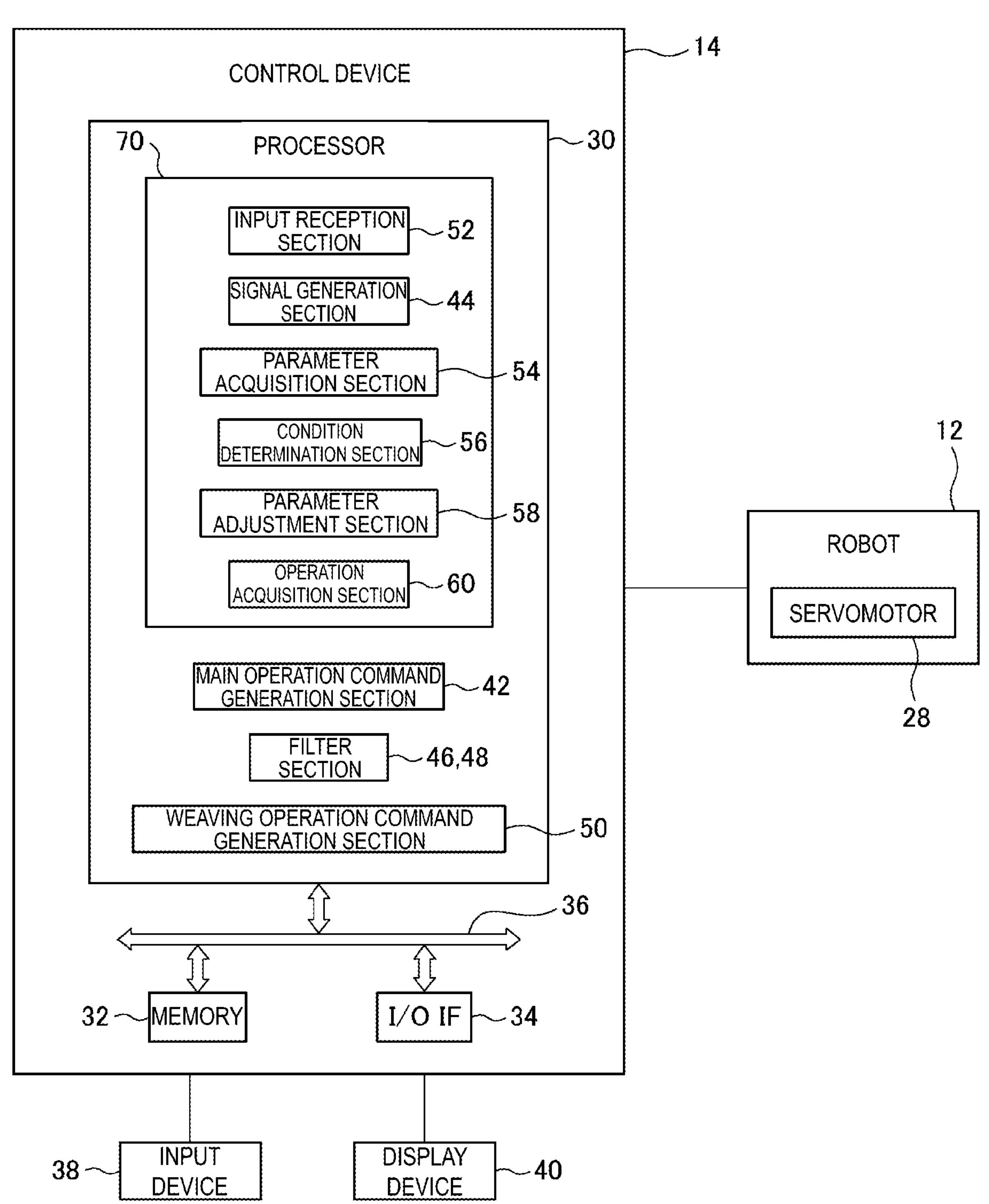
FIG. 2 is a block diagram of the robot system illustrated in FIG. 1.

The control device 14 controls operations of the robot 12. As illustrated in FIG. 2, the control device 14 is a computer including a processor 30, a memory 32, and an I/O interface 34. The processor 30 has a CPU, a GPU, or the like, is communicably connected to the memory 32 and the I/O interface 34 via a bus 36, and performs arithmetic operations for implementing various functions to be described later while communicating with these components.

The memory 32 includes a RAM, a ROM, or the like and temporarily or permanently stores various types of data used in the arithmetic operations executed by the processor 30 and various types of data generated in the process of the arithmetic operations. The I/O interface 34 includes, for example, an Ethernet (registered trademark) port, a USB port, an optical fiber connector, or a HDMI (registered trademark) terminal and performs wired or wireless data communication with an external device in response to a command from the processor 30. In the present embodiment, the servomotors 28 of the robot 12 are communicably connected to the I/O interface 34.

The control device 14 is provided with an input device 38 and a display device 40. The input device 38 includes a keyboard, a mouse, a touch panel, and the like and receives an input of data from an operator. The display device 40 includes a liquid crystal display, an organic EL display, or the like and displays various types of data.

The input device 38 and the display device 40 may be communicably connected to the I/O interface 34 in a wired or wireless manner. Also, the input device 38 and the display device 40 may be provided as separate elements from a housing of the control device 14 or may be integrally incorporated in the housing of the control device 14.

As illustrated in FIG. 1, a robot coordinate system C1 and a tool coordinate system C2 are set in the robot 12. The robot coordinate system C1 is a coordinate system for automatically controlling each movable element of the robot 12. In the present embodiment, the robot coordinate system C1 is set relative to the robot 12 with its origin disposed at the center of the robot base 16 and with its z-axis coinciding with the whirling axis of the rotary barrel 18. Note that the following description will be given on the assumption that the x-axis positive direction in the robot coordinate system C1 is on the right side, the y-axis positive direction is on the front side, and the z-axis positive direction is on the upper side for convenience.

The tool coordinate system C2 is a coordinate system for automatically controlling the position of the tool 26 in the robot coordinate system C1 and is set for the tool 26. Further, in the present description, the "position" may mean the position and the orientation. In the present embodiment, the tool coordinate system C2 is set for the tool 26 with its origin positioned at a work point of the tool 26 (e.g., a point at which the tool 26 causes the welding wire to melt) and with its z-axis direction coinciding with the working direction of the tool 26 (e.g., the direction of the center axis of the distal end of the welding torch or a laser beam emitting direction).

When the tool 26 is moved, the processor 30 sets the tool coordinate system C2 in the robot coordinate system C1 and transmits a command to each servomotor 28 of the robot 12 and causes each movable element of the robot 12 to operate such that the tool 26 is positioned at the position represented by the set tool coordinate system C2. In this manner, the processor 30 positions the tool 26 at a freely selected position in the robot coordinate system C1 through the operation of the robot 12.

Next, a weaving operation that the processor 30 causes the robot 12 to execute at the time of a welding work on the workpiece W will be described with reference to FIG. 3. The weaving operation is executed to widen the width of a bead formed in the workpiece W when the workpiece W is welded. Specifically, the processor 30 causes the robot 12 to move the tool 26 along a predetermined working path WP while swinging the tool 26 in a direction intersecting the working path WP in the weaving operation.

Figure 3:
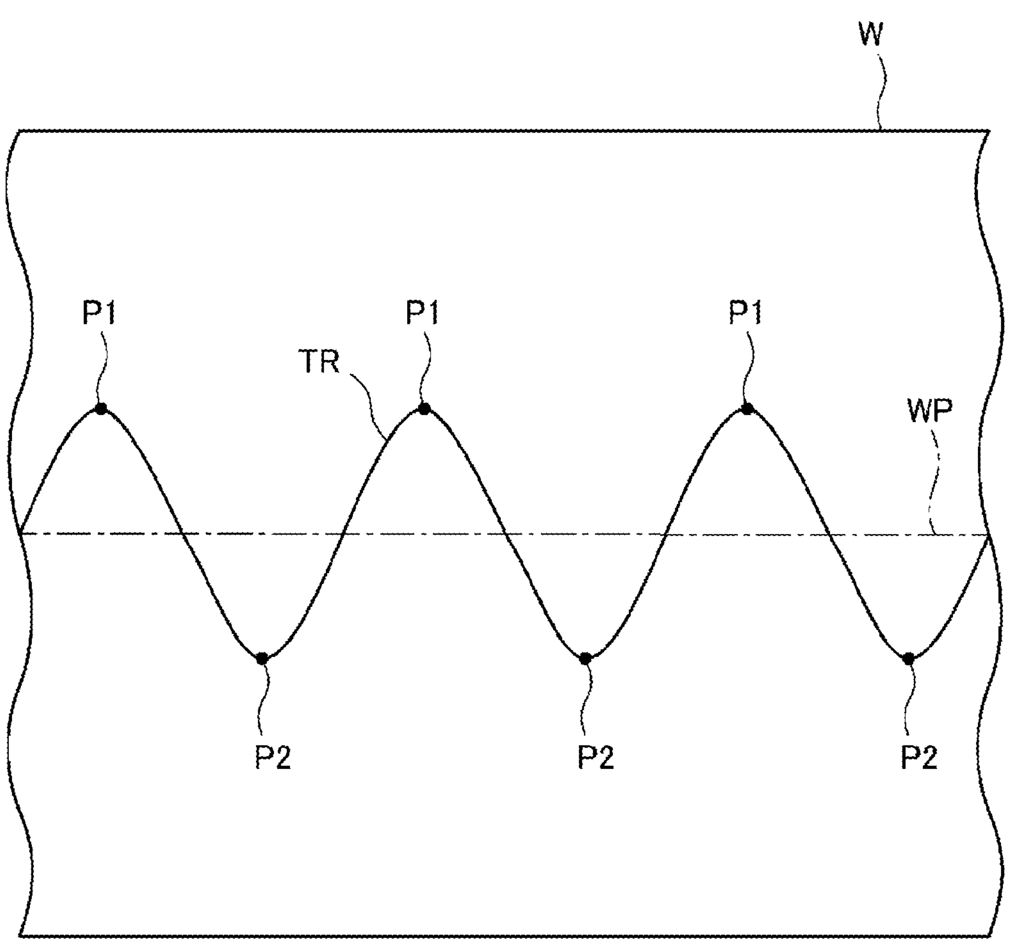
FIG. 3 illustrates a trajectory of a weaving operation executed by the robot illustrated in FIG. 1.
Figure 3:
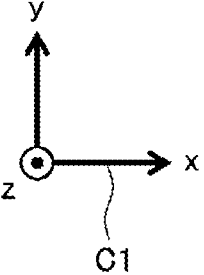

In the example illustrated in FIG. 3, the working path WP is set on the workpiece W and linearly extends in the x-axis direction in the robot coordinate system C1. In this example, the processor 30 causes the robot 12 to move the tool 26 rightward along the working path WP and at the same time, causes the tool 26 to swing in the front-back direction between an end point P1 on the front side and an end point P2 on the back side in the weaving operation. As a result, the tool 26 moves along a trajectory TR with a wave line shape relative to the workpiece W and welds the workpiece W, simultaneously.

Figure 4:
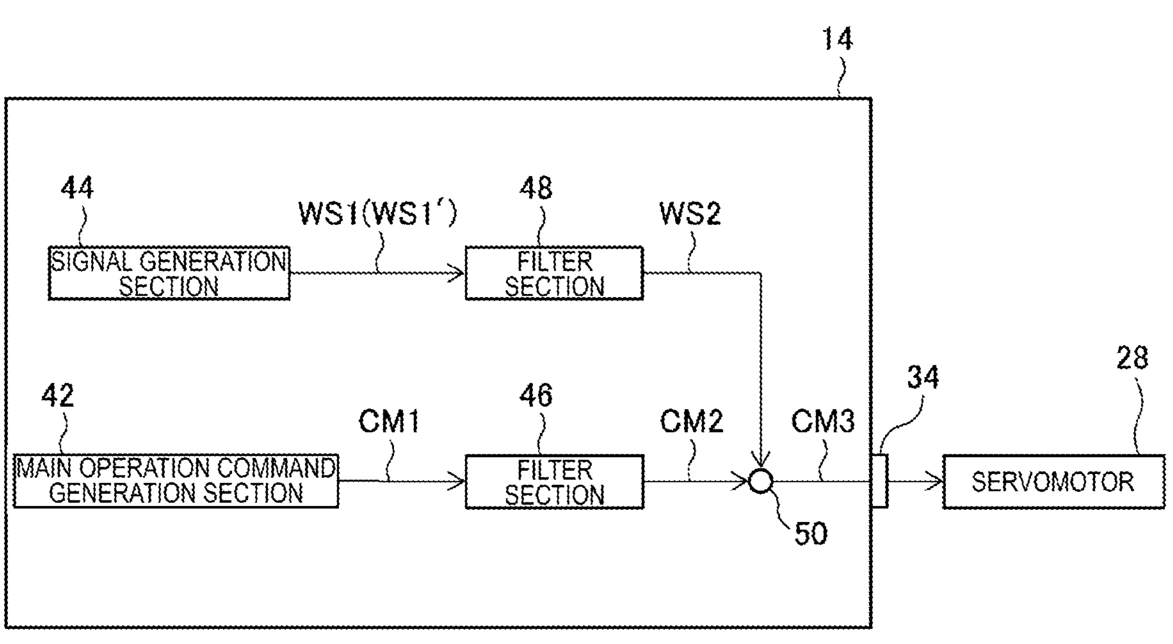
FIG. 4 is a block diagram of a function of generating a weaving operation command in a control device illustrated in FIG. 1.

The processor 30 generates a weaving signal WS for causing the tool 26 to swing in the weaving operation. Hereinafter, generation of the weaving signal WS will be described with reference to FIGS. 4 to 6. As illustrated in FIG. 4, the control device 14 has a main operation command generation section 42, a signal generation section 44, filter sections 46 and 48, and a weaving operation command generation section 50. The main operation command generation section 42 generates a main operation command CM1 for causing the robot 12 to move the tool 26 in a direction of the working path WP in the aforementioned weaving operation.

The filter section 46 is a digital filter (an FIR filter or an IIR filter) and executes filtering FR1 for removing a high-frequency component on the main operation command CM1 generated by the main operation command generation section 42 for a predetermined filtering time $\tau 1$. For example, the filter section 46 executes the filtering FR1 as low pass filtering by performing moving average processing on the digital signal of the main operation command CM1 every filtering time $\tau 1$.

Alternatively, the filter section 46 may be configured to execute the filtering FR1 as band pass filtering or notch filtering. The filter section 46 generates a main operation command CM2 by executing the filtering FR1 on the main operation command CM1 and outputs the main operation command CM2 to the weaving operation command generation section 50.

Figure 5:
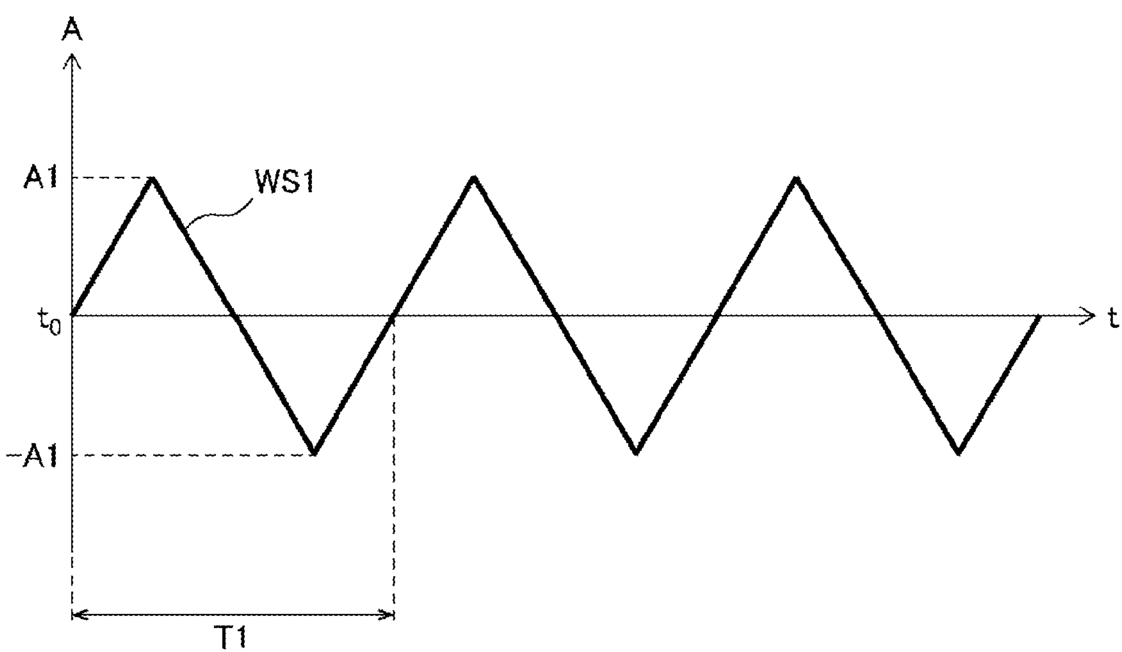
FIG. 5 illustrates a waveform of a weaving signal.

The signal generation section 44 generates a weaving signal WS1. An example of the weaving signal WS1 is illustrated in FIG. 5. Note that the vertical axis in FIG. 5 represents an amplitude A by which the tool 26 is caused to swing in the front-back direction (i.e., the distance A from the working path WP), and the horizontal axis represents a time t. In the example illustrated in FIG. 5, the weaving signal WS1 is a triangular wave at a cycle T1 having an amplitude A1 (i.e., frequency f1=1/T1), and a phase $\varphi 1$ with respect to a reference time to (e.g., a start time of the weaving operation) is zero. The amplitude A1, the frequency f1 (or the cycle T1), and the phase $\varphi 1$ configure parameters PR1 defining the weaving signal WS1.

Referring again to FIG. 4, the filter section 48 is a digital filter that is similar to the aforementioned filter section 46, and executes filtering FR2 for removing a high-frequency component on the weaving signal WS1 generated by the signal generation section 44 in a predetermined filtering time $\tau 2$. The filtering FR2 may be the same as or different from the aforementioned filtering FR1.

For example, the filter section 48 executes the filtering FR2 as low pass filtering by performing moving average processing on the weaving signal WS1 as a digital signal every filtering time $\tau 2$. Alternatively, the filter section 48 may be configured to execute the filtering FR2 as band pass filtering or notch filtering.

Figure 6:
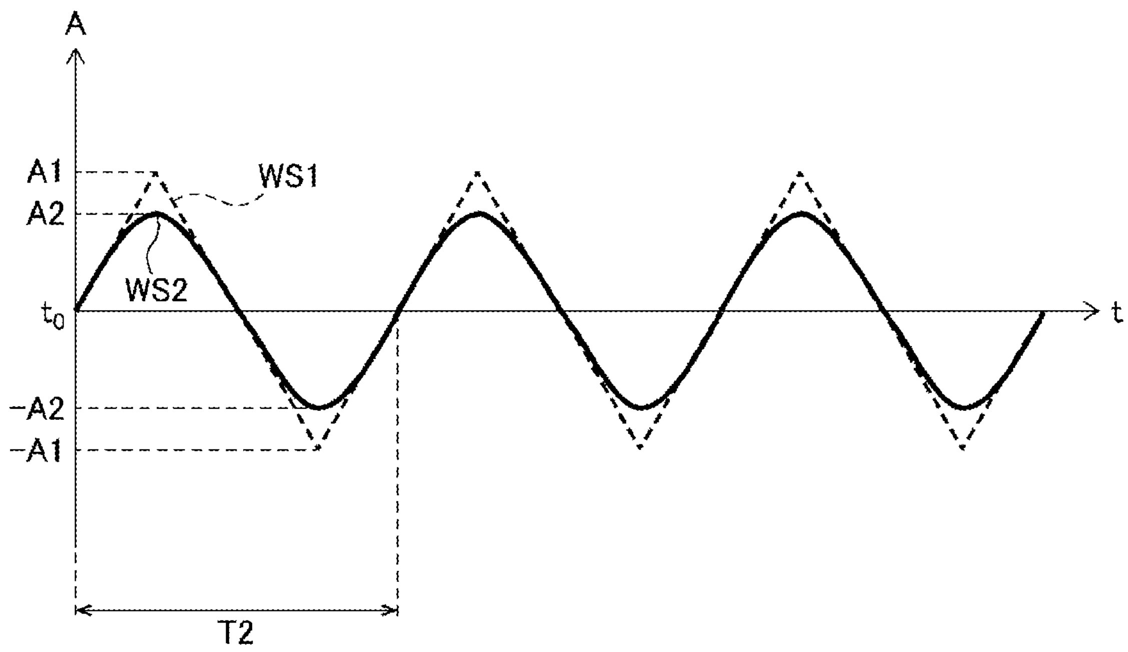
FIG. 6 illustrates a waveform when filtering is executed on the weaving signal illustrated in FIG. 5.

Once the filter section 48 executes the filtering FR2 on the weaving signal WS1, the weaving signal WS1 changes, and a weaving signal WS2 illustrated by the solid line in FIG. 6 is thereby generated. The weaving signal WS2 has parameters PR2 including an amplitude A2, a cycle T2 (frequency f2=1/T2), and a phase $\varphi 2$.

At least one of the parameters PR2 (the amplitude A2, the frequency f2, and the phase $\varphi 2$) of the weaving signal WS2 can change compared to the corresponding of the parameters PR1 (the amplitude A1, the frequency f1, and the phase $\varphi 1$) of the weaving signal WS1 through the filtering FR2. Note that in the following description, the parameters PR2 may be referred to as post-filtering parameters PR2.

Note that in the example illustrated in FIG. 6, the weaving signal WS1 of a triangular wave is changed into the weaving signal WS2 with a waveform similar to that of a triangular function (i.e., a frequency property is changed by the high-frequency component being removed), and the amplitude A2 of the weaving signal WS2 is attenuated and becomes smaller than the amplitude A1 of the weaving signal WS1 (A2<A1) as a result of the filtering FR2. The filter section 48 outputs the generated weaving signal WS2 to the weaving operation command generation section 50.

Referring again to FIG. 4, the weaving operation command generation section 50 generates a weaving operation command CM3 for causing the robot 12 to execute a weaving operation by applying the weaving signal WS2 to the main operation command CM2. Specifically, the weaving operation command generation section 50 is an adder and generates the weaving operation command CM3 (=CM2+WS2) by adding the weaving signal WS2 to the main operation command CM2.

The weaving operation command CM3 generated by the weaving operation command generation section 50 is output to the servomotors 28 of the robot 12 through the I/O interface 34 and a servo amplifier (not illustrated). The robot 12 executes a weaving operation and causes the tool 26 to move along the trajectory TR illustrated in FIG. 3 in accordance with the weaving operation command CM3.

Note that the main operation command generation section 42, the signal generation section 44, the filter sections 46 and 48, and the weaving operation command generation section 50 can be functional modules implemented by a computer program executed by the processor 30. In this case, the processor 30 functions as the main operation command generation section 42, the signal generation section 44, the filter sections 46 and 48, and the weaving operation command generation section 50. Alternatively, at least one (e.g., the filter sections 46 and 48) of the signal generation section 44, the filter sections 46 and 48, and the weaving operation command generation section 50 may be mounted as an analog circuit on the control device 14.

Figure 7:
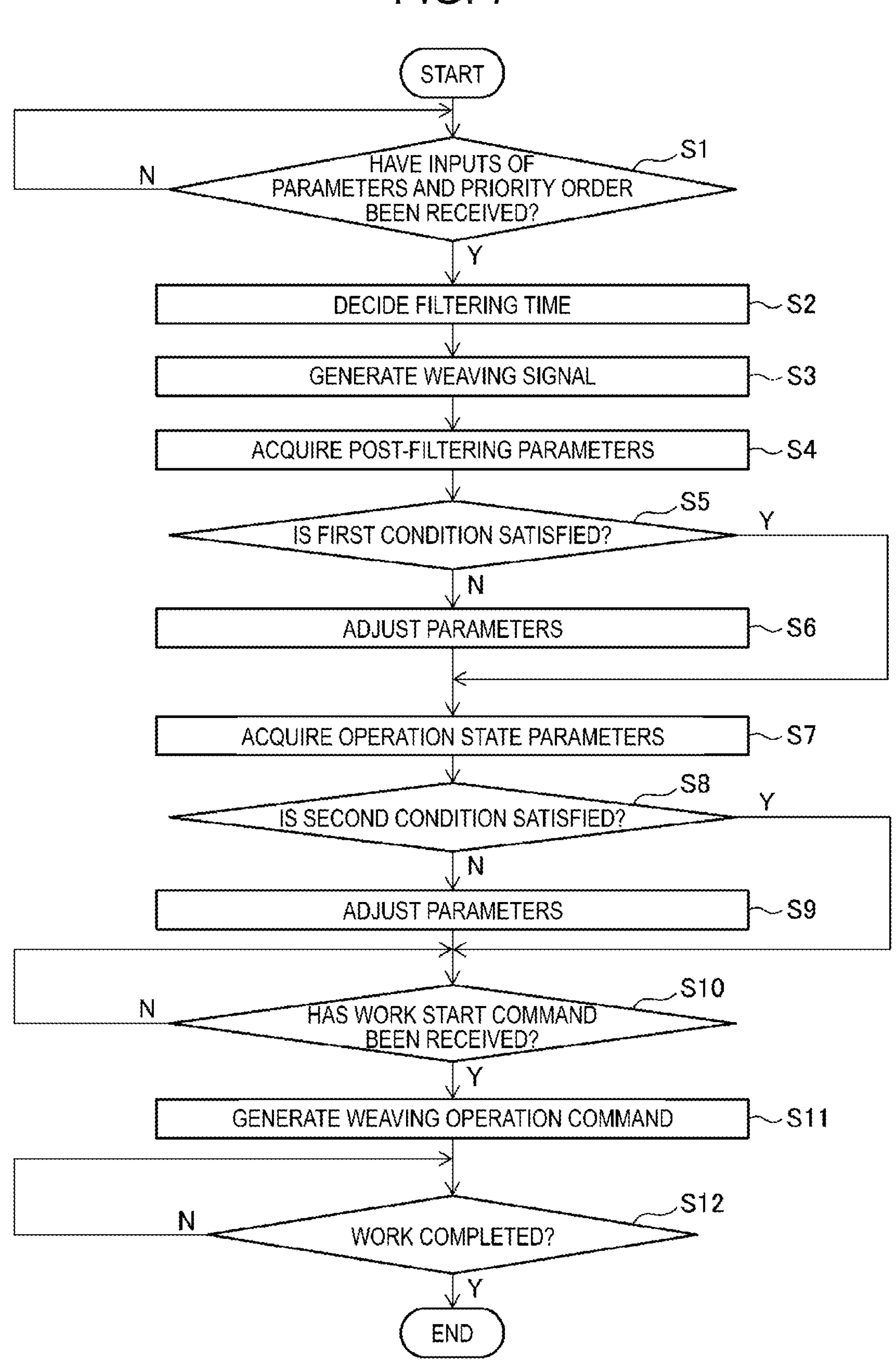
FIG. 7 is a flowchart illustrating an example of a method for generating a weaving signal.

Next, a method for generating the weaving signal WS will be described in further detail with reference to FIG. 7. The procedure illustrated in FIG. 7 is started when the control device 14 is activated, for example. In Step S1, the processor 30 determines whether inputs of the parameters PR1 of the weaving signal WS1 (FIG. 5) and the priority order PO of the parameters PR1 have been received.

Specifically, the processor 30 generates an input image to input the parameters PR1 and the priority order PO and causes the display device 40 to display the input image after the start of the procedure in FIG. 7. The operator operates the input device 38 and inputs the parameters PR1 while visually recognizing the display device 40. Here, the parameters PR1 that can be input by the operator includes an end-point stop time $t_s$ in addition to the amplitude A1, the frequency f1, and the phase $\varphi 1$ described above.

Figure 8:
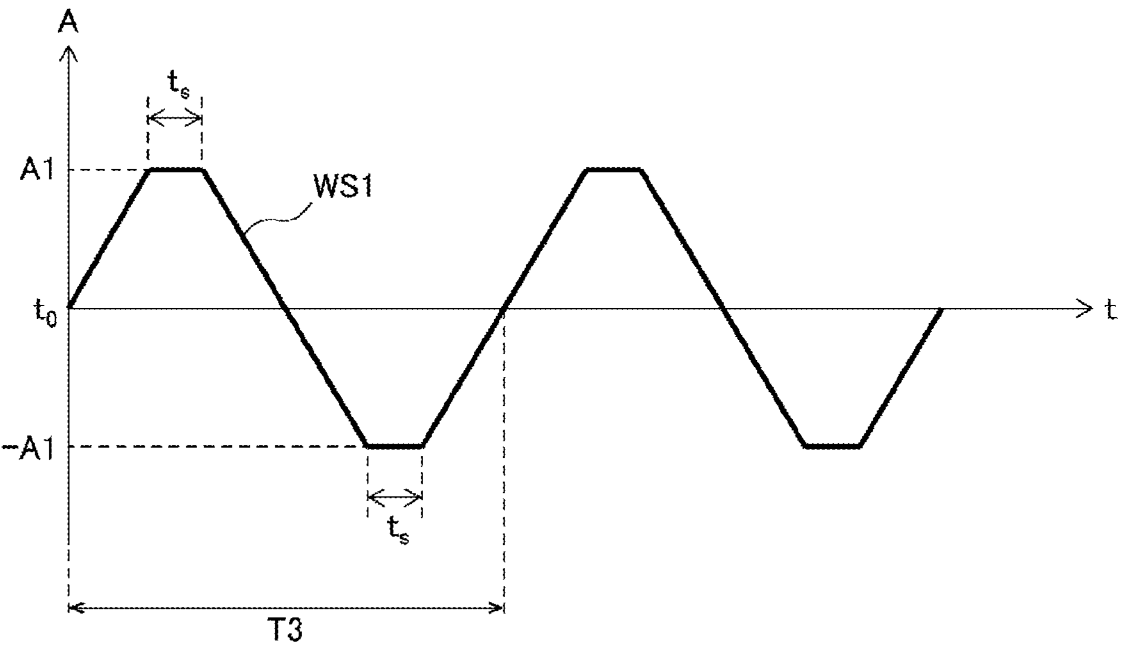
FIG. 8 illustrates a waveform of a weaving signal for which an end-point stop time has been set.

The end-point stop time $t_s$ defines a time for maintaining the tool 26 at an end point P1 or P2 of the swinging operation of the tool 26 in the weaving operation (i.e., the position at which the amplitude A becomes A1 or −A1 in FIG. 5). An example of the weaving signal WS1 when the end-point stop time $t_s$ has been set is illustrated in FIG. 8.

For example, it is assumed that the operator has input the amplitude A1, the frequency f1, the end-point stop time $t_s$, and the phase $\varphi 1$=0 as the parameters PR1. In this case, the processor 30 sets the end-point stop time $t_s$ at the points of the amplitudes A1 and −A1 (apexes of the triangular wave) of the weaving signal WS1 while maintaining an inclination of the weaving signal WS1 as a triangular wave having the amplitude A1 and the frequency f1 illustrated in FIG. 5. As a result, the weaving signal WS1 is set as a trapezoidal wave illustrated in FIG. 8. Therefore, in this case, the frequency f of the weaving signal WS1 is changed from the frequency f1 input by the operator to the frequency f3 ($=1/T3<f1$, $T3=T1+2t_s$).

The processor 30 receives inputs of the parameters PR1 through the input device 38. In this manner, the processor 30 functions as the input reception section 52 (FIG. 2) that receives inputs of the parameters PR1 of the weaving signal WS1 in the present embodiment. The processor 30 stores the received parameters PR1 as parameter setting values PR1v of the weaving signal WS1 in the memory 32. Hereinafter, a case where the processor 30 has received inputs of the parameters PR1 (the amplitude A1, the frequency f1, the phase $\varphi 1=0$, and the end-point stop time $t_s=0$) of the weaving signal WS1 illustrated in FIG. 5 will be described.

The operator operates the input device 38 and inputs the priority order PO along with the parameters PR1. Here, at least one of the parameters PR1 (e.g., the amplitude A1) of the original weaving signal WS1 can change through the filtering FR2 as described above with reference to FIG. 6. The priority order PO sets which parameter takes priority to reproduce a value among the values input by the operator in Step S1 reproduced when at least one of the parameters PR1 changes.

For example, the operator inputs the amplitude A1, the frequency f1, the phase φ, and the end-point stop time $t_s$ as the parameters PR1 and inputs the priority order PO requiring that the value of the amplitude A1 be reproduced with priority (i.e., the priority order PO in which the priority order of the amplitude A1 is the first place) in Step S1. The processor 30 functions as the input reception section 52 and receives the input of the priority order PO.

In Step S2, the processor 30 decides a filtering time τ2 of the filtering FR2. Specifically, the processor 30 reads a unique filtering time $\tau_a$. The unique filtering time $\tau_a$ is determined uniquely for each type of robot 12 and is stored in the memory 32 in advance. On the other hand, the processor obtains an allowable filtering time $\tau_b$ based on the parameters PR1 received in Step S1.

The allowable filtering time $\tau_b$ is a filtering time which can allow a post-filtering parameter PR2 (e.g., the amplitude A2) changed from the corresponding of the parameters PR1 (e.g., the amplitude A1) of the original weaving signal WS1 through the filtering FR2 to fall within a predetermined allowable range (e.g., the amplitude A2 falls within a range of equal to or greater than 50% of amplitude A1).

For example, the processor 30 may obtain the allowable filtering time $\tau_b$ as $\tau_b=T1/2$. Then, the processor 30 decides that the filtering time τ2 is a longer one of the specific filtering time $\tau_a$ and the allowable filtering time $\tau_b$. In this manner, the processor 30 decides the filtering time τ2 based on the received parameters PR1 in the present embodiment.

In Step S3, the processor 30 functions as the signal generation section 44 and generates the weaving signal WS1 having the parameters PR1 received in Step S1. In this manner, the processor generates the weaving signal WS1 having the amplitude A1, the frequency f1, the phase φ1 (=0), and the end-point stop time $t_s$ (=0) as illustrated in FIG. 5.

In Step S4, the processor 30 acquires the post-filtering parameters PR2. The post-filtering parameters PR2 are parameters PR2 after the change in the weaving signal WS1 in the case where the filtering FR2 is executed on the weaving signal WS1 generated in Step S3. In an example, the processor 30 acquires the post-filtering parameters PR2 by emulating the actual filtering FR2 on the weaving signal WS1 generated in Step S3 described above in Step S4.

In another example, the processor 30 may obtain the post-filtering parameters PR2 through an arithmetic operation based on the parameters PR1 received in Step S1 and the filtering time τ2 decided in Step S2. Hereinafter, a method for obtaining the post-filtering parameters PR2 through an arithmetic operation will be described with reference to FIG. 9.

Figure 9:
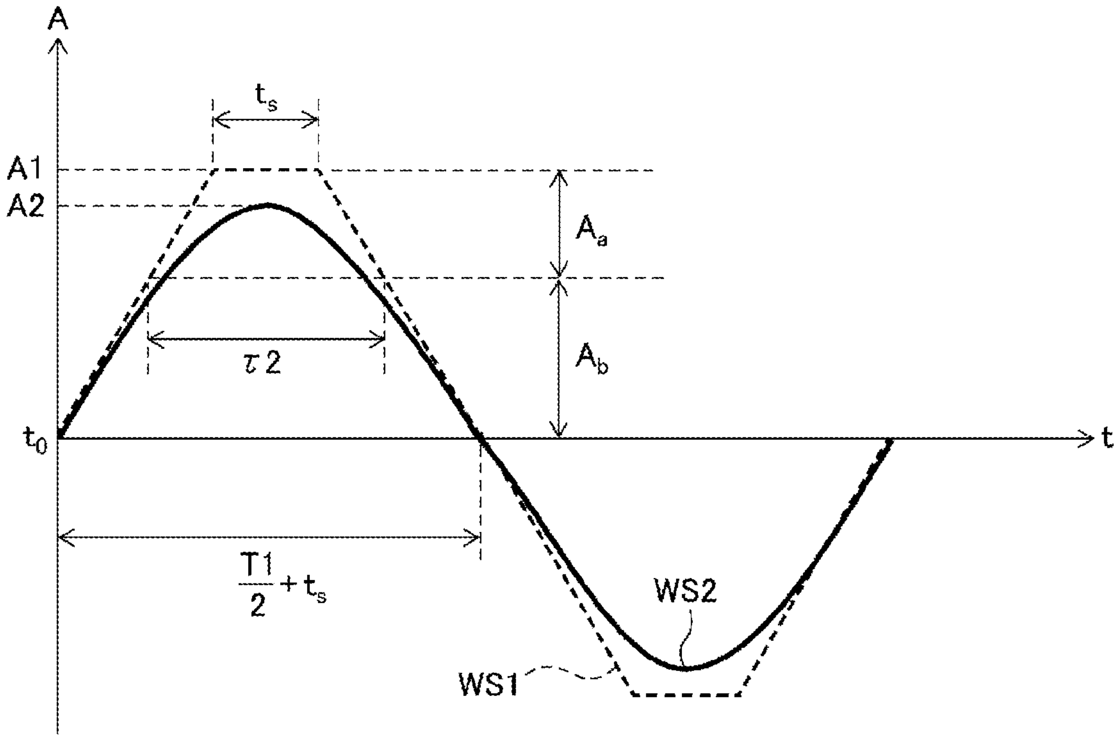
FIG. 9 is a diagram for explaining a method for obtaining a post-filtering parameter through an arithmetic operation.

FIG. 9 illustrates the weaving signal WS1 having the amplitude A1, the frequency f3 ($=1/T3=1/(T1+2t_s)$), the phase φ1 (=0), and the end-point stop time $t_s$, and the filtering time τ2 of the filtering FR2 has been set for the weaving signal WS1. In this example, the processor 30 can obtain the amplitude A2 of the weaving signal WS2 obtained by performing the filtering FR2 on the weaving signal WS1 through an arithmetic operation from Equation (1) below.

$$A2=A_B+A_A(1+T_S/T2)/2 \tag{1}$$

Here, $A_a$ and $A_b$ in Equation (1) are obtained from Equations (2) and (3) below, respectively.

$$A_A=A1(2(T2-T_S)/T1) \tag{2}$$

$$A_B=A1-A_A=A1-A1(2(T2-T_S)/T1) \tag{3}$$

Note that in the present embodiment, the end-point stop time $t_s$ received in Step S1 is zero and $t_s=0$ is thus substituted to Equations (1) to (3) described above. In this manner, the processor can obtain the amplitude A2 as one of the post-filtering parameters PR2 through the arithmetic operation from Equation (1). In other words, the processor 30 can acquire the post-filtering parameters PR2 without executing the actual filtering FR2 on the weaving signal WS1 generated in Step S3 in this case.

In this manner, the processor 30 functions as the parameter acquisition section 54 (FIG. 2) that acquires the post-filtering parameters PR2 in the present embodiment. Note that it is assumed that the frequency f1 and the phase φ1 do not change even when the filtering FR2 is executed on the weaving signal WS1 in the present embodiment. Therefore, the frequency f2 and the phase φ2 in the post-filtering parameters PR2 are the same as the frequency f1 and φ1 (f2=f1, φ2=φ1).

Referring again to FIG. 7, the processor 30 determines whether the post-filtering parameters PR2 acquired in Step S4 satisfy a predetermined first condition CD1 in Step S5. In the present embodiment, the first condition CD1 is set as a condition that the post-filtering parameters PR2 are substantially the same as the parameters PR1 received in Step S1.

For example, for the amplitude A2 of the post-filtering parameters PR2, when the amplitude A2 falls within an allowable range set with reference to the amplitude A1 (e.g., a range of equal to or greater than 90% of the amplitude A1), the processor 30 determines that the post-filtering parameter PR2 (amplitude A2) is substantially the same as the parameter PR1 (amplitude A1) and thus determines that the first condition CD1 is satisfied (i.e., YES). On the other hand, when the amplitude A2 is outside the allowable range, the processor 30 determines that the post-filtering parameter PR2 is different from the parameter PR1, and thereby determines that the first condition CD1 is not satisfied (i.e., NO).

Note that in Step S5, the processor 30 may determine whether the first condition CD1 is satisfied only for the parameter PR1 (e.g., the amplitude A1) with a high priority order PO received in Step S1. Alternatively, the processor 30 may determine whether the first condition CD1 is satisfied for all the parameters PR1 (the amplitude A1, the frequency f1, the phase φ1, and the end-point stop time $t_s$) received in Step S1.

In this manner, the processor 30 functions as the condition determination section 56 (FIG. 2) that determines whether the post-filtering parameters PR2 satisfy the condition CD1 in the present embodiment. The processor 30 moves on to Step S7 in a case of determination of YES in Step S5 or moves on to Step S6 in a case of determination of NO.

In Step S6, the processor 30 adjusts the parameters PR1 received in Step S1 to satisfy the first condition CD1. Specifically, the processor 30 adjusts the parameters PR1 to enable the post-filtering parameters FR2 acquired in Step S4 to coincide with the parameters PR1 received in Step S1.

Figure 10:
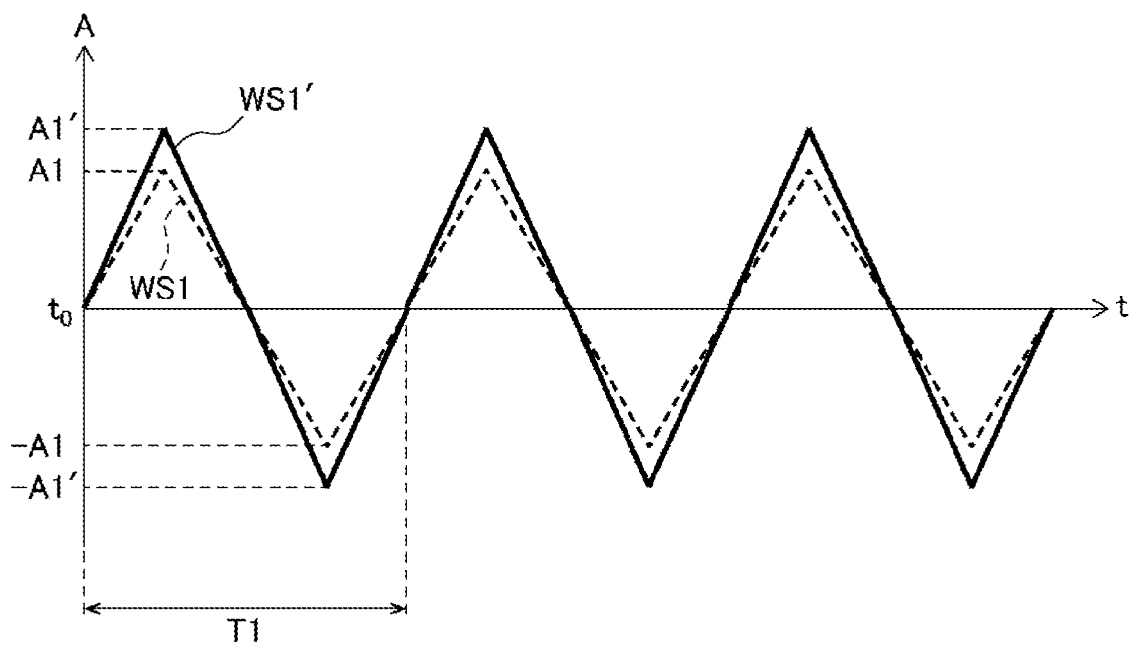
FIG. 10 illustrates a waveform when an amplitude has been adjusted as a parameter of a weaving signal.

For example, the processor 30 increases the amplitude A1 as one of the parameters PR1 received in Step S1 to an amplitude A1' (>A1) as illustrated in FIG. 10. As a result, the weaving signal WS1 generated by the signal generation section 44 (FIG. 4) is changed to a weaving signal WS1' having the amplitude A1'.

Figure 11:
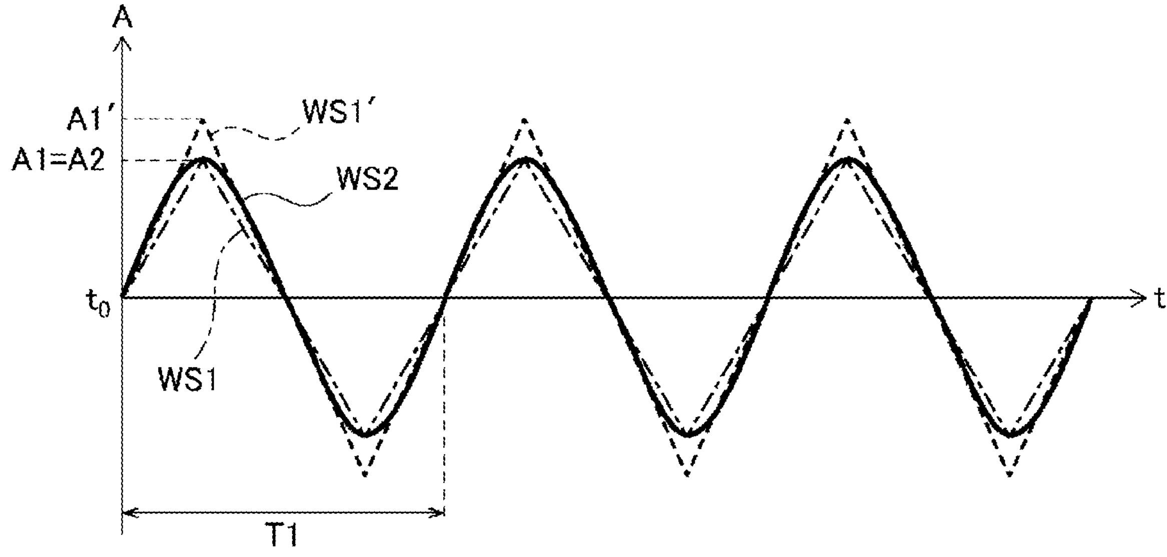
FIG. 11 illustrates a waveform when filtering has been executed on the weaving signal after the parameter adjustment illustrated in FIG. 10.

A weaving signal WS2 generated when the filtering FR1 is executed on the weaving signal WS1' after the parameter adjustment is illustrated in FIG. 11. As illustrated in FIG. 11, it is possible to cause the amplitude A2 of the weaving signal WS2 to coincide with the amplitude A1 received in Step S1 (A2=A1) by increasing the amplitude A1 of the parameter PR1 to the amplitude A1'.

In this manner, the post-filtering parameters PR2 (the amplitude A2, the frequency f2, and the phase φ2) of the weaving signal WS2 coincide with the parameters PR1 of the weaving signal WS1 (A2=A1, f2=f1, φ2=φ1=0, is =0) and can thus satisfy the first condition CD1.

Note that the processor 30 may set a change amount by which the amplitude A1 is increased in Step S6 may be set based on the amount of change from the amplitude A1 to the amplitude A2 illustrated in FIG. 6. In an example, the processor 30 acquires a difference Δ1 (=Δ1−A2) between the amplitude A1 and the amplitude A2 in FIG. 6 in Step S4. Then, the processor 30 obtains the amplitude A1' (=A1+Δ1×α) by adding Δ1×α (where a is a predetermined coefficient) to the amplitude A1 in Step S6. In another example, the processor 30 acquires a ratio R1 (=A1/A2) between the amplitude A1 and the amplitude A2 in FIG. 6 in Step S4. Then, the processor 30 obtains the amplitude A1' (=A1×R1) by multiplying the amplitude A1 by the ratio R1 in Step S6.

In this manner, the processor 30 adjusts at least one of the parameters PR1 (e.g., the amplitude A1) to the corresponding of the parameters PR1' (the amplitude A1') to satisfy the first condition CD1. Thus, the processor 30 functions as the parameter adjustment section 58 (FIG. 2) in the present embodiment. The processor 30 updates parameter setting values PR1v stored in the memory 32 to the parameters PR1' after the adjustment in Step S6.

In Step S7, the processor 30 acquires operation state parameters OPR. The operation state parameters OPR are parameters representing an operation state of the robot 12 when the robot 12 is caused to execute a weaving operation in accordance with the weaving signal WS2 and include, for example, a speed V, acceleration a, and jerk j of the robot 12.

For example, when Step S7 is executed after determination of YES in Step S5, the operation state parameters OPR include the speed V, the acceleration a, and the jerk j of the robot 12 when the robot 12 is caused to execute a weaving operation in accordance with the weaving signal WS2 illustrated in FIG. 6. The weaving signal WS2 illustrated in FIG. 6 has the post-filtering parameters PR2 (the amplitude A2<A1, the frequency f2=f1, and the phase φ2=φ1) corresponding to the parameters PR1 received in Step S1.

On the other hand, when Step S7 is executed after Step S6, the operation state parameters OPR include the speed V, the acceleration a, and the jerk j of the robot 12 when the robot 12 is caused to execute the weaving operation in accordance with the weaving signal WS2 illustrated in FIG. 11. The weaving signal WS2 in FIG. 11 has the post-filtering parameters PR2 (the amplitude A2=A1, the frequency f2=f1, and the phase φ2=φ1) corresponding to the parameters PR1' after the adjustment in Step S6.

In Step S7, the processor 30 acquires the post-filtering parameters PR2 of the weaving signal WS2 in FIG. 6 or 11 by executing a process similar to that in Steps S3 and S4 described above. Specifically, when Step S7 is executed after determination of YES in Step S5, the processor simulatively generates the weaving signal WS1 having the parameters PR1 received in Step S1 and subsequently acquires the post-filtering parameters PR2 (the amplitude A2<A1, the frequency f2=f1, and the phase φ2=φ1) corresponding to the weaving signal WS1.

On the other hand, when Step S7 is executed after determination of NO in Step S5, the processor 30 simulatively generates the weaving signal WS1' having the parameters PR1' after the adjustment in Step S6 and subsequently acquires the post-filtering parameters PR2 (the amplitude A2=A1, the frequency f2=f1, and the phase φ2=φ1) corresponding to the weaving signal WS1'.

Next, the processor 30 simulatively generates the weaving signal WS2 having the acquired post-filtering parameters PR2. At the same time with this, the processor 30 functions as the main operation command generation section 42, simulatively generates the main operation command CM1, and subsequently functions as the filter section 46, executes the filtering FR1 on the main operation command CM1, and thereby generates the main operation command CM2.

Then, the processor 30 functions as the weaving operation command generation section 50, applies the generated weaving signal WS2 to the main operation command CM2, and thereby generates a weaving operation command CM3 (=CM2+WS2) as a simulation. The processor 30 obtains the speed V, the acceleration a, and the jerk j of the robot 12 when the robot 12 is caused to execute a weaving operation in accordance with the weaving operation command CM3, based on the weaving operation command CM3 generated simulatively.

At this time, the processor 30 may acquire the speed V, the acceleration a, and the jerk j by performing a simulation of causing the robot 12 to execute the weaving operation in accordance with the weaving operation command CM3. In this manner, the processor 30 functions as the operation acquisition section 60 (FIG. 2) that acquires the operation state parameters OPR (the speed V, the acceleration a, and the jerk j) in the present embodiment.

In Step S8, the processor 30 functions as the condition determination section 56 and determines whether the post-filtering parameters PR2 satisfy a predetermined second condition CD2. In the present embodiment, the second condition CD2 is set as a condition that the operation state parameters OPR (the speed V, the acceleration a, and the jerk j) acquired in Step S7 do not exceed predetermined allowable values.

For example, the processor 30 determines whether each of the speed V, the acceleration a, and the jerk acquired in Step S7 exceeds the corresponding allowable value. Then, when at least one of the speed V, the acceleration a, and the jerk j exceeds the corresponding allowable value, the processor 30 determines that the post-filtering parameters PR2 of the weaving signal WS2 for which the operation state parameters OPR have been acquired in Step S7 do not satisfy the second condition CD2 (i.e., NO).

On the other hand, when neither the speed V, the acceleration a, nor the jerk j exceeds the corresponding allowable values, the processor 30 determines that the post-filtering parameters PR2 satisfy the second condition CD2 (i.e., YES). The allowable values of the speed V, the acceleration a, and the jerk j are stored in the memory 32 in advance.

Note that the processor 30 may acquire only one operation state parameter OPR (e.g., the speed V) in Step S7 and determine whether the one operation state parameter OPR exceeds the allowable value in Step S8. The processor 30 moves on to Step S10 in a case of determination of YES in Step S8 or moves on to Step S9 in a case of determination of NO.

In Step S9, the processor 30 functions as the parameter adjustment section 58 and adjusts the parameters PR1 or PR1' to satisfy the second condition CD2. Specifically, the processor 30 adjusts the parameters PR1 or PR1' as follows in accordance with the priority order PO received in Step S1.

In other words, the processor 30 adjusts the parameters PR1 or PR1' such that a post-filtering parameter PR2 corresponding to a first parameter PR1 or PR1' with a high priority order PO coincides with the first parameter PR1 or PR1' and the post-filtering parameter PR2 corresponding to a second parameter PR1 or PR1' with a low priority order is allowed to be different from the second parameter PR1 or PR1'.

Figure 12:
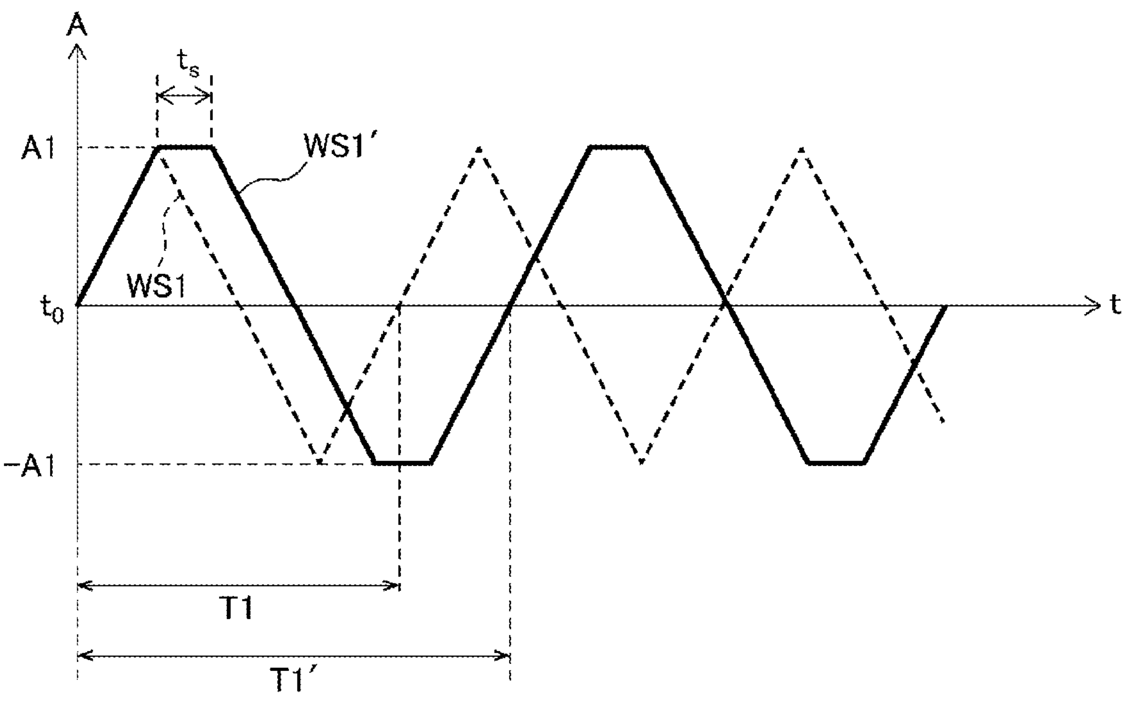
FIG. 12 illustrates a waveform when an end-point stop time has been set as a parameter of a weaving signal.

Hereinafter, a case where the processor 30 has received an input of a priority order PO requiring that the amplitude A1 be reproduced with priority in Step S1 will be described. When Step S9 is executed after determination of YES in Step S5 (i.e., without executing Step S6), for example, the processor 30 adjusts the parameters PR1 of the weaving signal WS1 illustrated in FIG. 5 to set the end-point stop time $t_s$ (>0). FIG. 12 illustrates the weaving signal WS1' for which the end-point stop time $t_s$ has been set in this manner.

The frequency f1' (=1/T1') of the weaving signal WS1' illustrated in FIG. 12 is lower than the frequency f1 of the original weaving signal WS1. In other words, the processor 30 adjusts the parameters PR1 to the parameters PR1' having the amplitude A1, the frequency f1', the phase φ(=0), and the end-point stop time $t_s$ (>0) in this case.

Figure 13:
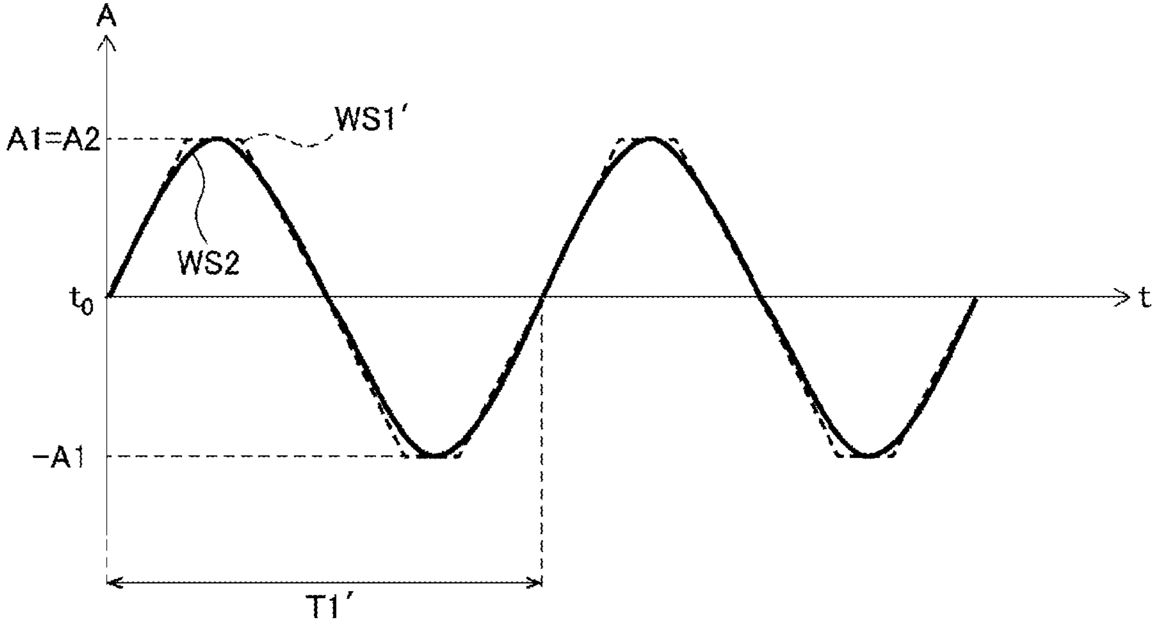
FIG. 13 illustrates a waveform when filtering has been executed on the weaving signal after the parameter adjustment illustrated in FIG. 12.

When the filtering FR2 is executed on the weaving signal WS1' having the post-adjustment parameters PR1', the weaving signal WS2 illustrated in FIG. 13 is obtained. The weaving signal WS2 has the amplitude A2=A1 as the post-filtering parameter PR2.

In this manner, it is possible to reproduce the amplitude A1 as the amplitude A2 of the post-filtering parameter PR2 by adjusting the end-point stop time $t_s$ to become long. The end-point stop time $t_s$ adjusted at this time is set to satisfy the second condition CD2. For example, the end-point stop time $t_s$ can be set as a value that coincides with the filtering time τ2 (or a value obtained by multiplying the filtering time τ2 by a predetermined coefficient).

On the other hand, when Step S9 is executed after determination of NO in Step S5 in FIG. 7 (i.e., after the execution of Step S6), the processor 30 cancels the parameters PR1' adjusted in Step S6 first (i.e., the parameters PR1' stored as the parameter setting values PR1v at this time point are deleted).

Then, the processor 30 adjusts the parameters PR1 received in Step S1 to set the end-point stop time $t_s$ similarly to the method described in FIG. 12. As a result, the weaving signal WS1' (FIG. 12) having the parameters PR1' newly adjusted in Step S9 is generated, and as a result, the amplitude A1 is reproduced as the amplitude A2 of the parameters PR2.

Note that the processor 30 can also reproduce the amplitude A1 without setting the end-point stop time $t_s$. When Step S9 is executed after determination of NO in Step S5, for example, the processor 30 further adjusts the parameters PR1' such that the frequency f1 of the parameters PR1' after the adjustment in Step S6 is reduced to f1'.

In other words, the cycle T1 of the weaving signal WS1' illustrated in FIG. 10 increases to a longer cycle T1' (>T1) in this case. Therefore, the parameters PR1' after further adjustment include the amplitude A1' and the frequency f1'. At this time, a change amount by which the frequency f1 is reduced to the frequency f1' may be set based on the amplitude A1' such that the second condition CD2 can be satisfied.

In an example, a data table DT including the amplitude A and the frequency f that enable the second condition CD2 to be satisfied may be stored in the memory 32 in advance. The data table DT can be created in advance by an experimental method or simulation. Then, the processor 30 may read the frequency f corresponding to the amplitude A1' from the data table DT and decide the frequency f as the frequency f1' of the parameters PR1'.

When priority is to be placed on the amplitude A1 in accordance with the priority order PO in this manner, the processor 30 adjusts the parameters PR1 or PR1' such that the amplitude A2 of the post-filtering parameters PR2 coincide with the amplitude A1 of the parameter PR1 received in Step S1 and the frequency f2 of the post-filtering parameters PR2 is allowed to be different from the frequency f1 received in Step S1.

Next, a case where the processor 30 has received an input of the priority order PO requiring that the frequency f1 be reproduced with priority in Step S1 will be described. When Step S9 is executed after determination of YES in Step S5, for example, the processor 30 adjusts the parameters PR1 of the weaving signal WS1 illustrated in FIG. 5 to reduce the amplitude A1. Also, when Step S9 is executed after determination of NO in Step S5, the processor 30 further adjusts the parameters PR1' of the weaving signal WS1' illustrated in FIG. 10 to reduce the amplitude A1'.

Here, whether the second condition CD2 can be satisfied (i.e., whether the operation state parameters OPR exceed allowable values) depends on a combination of the amplitude A2 and the frequency f2 of the weaving signal WS2. Specifically, as the amplitude A2 increases, and as the frequency f2 increases, the likelihood that the second condition CD2 cannot be satisfied increases.

Therefore, it is possible to adjust the parameters PR1 or PR1' such that the second condition CD2 is satisfied (i.e., such that the operation state parameters OPR do not exceed the allowable values) by lowering the frequency f1 or by reducing the amplitude A1 or A1' in Step S9. The processor 30 updates the parameter setting values PR1v stored in the memory 32 to the parameters PR1' after the adjustment in Step S9.

Referring again to FIG. 7, the processor 30 determines whether a work start command has been received from the operator, a higher-order computer, or a computer program in Step S10. The processor 30 moves on to Step S11 when it is determined that the work start command has been received (i.e., YES) or repeats Step S10 in a case of determination of NO.

In Step S11, the processor 30 generates the weaving operation command CM3. Specifically, the processor 30 functions as the signal generation section 44 as described above with reference to FIG. 4 and generates the weaving signal WS1 (FIG. 5) or WS1' (FIG. 10 or FIG. 12) having the parameters PR1 or PR1' by using the parameters PR1 or PR1' stored as the parameter setting values PR1v at this time point.

Then, the processor 30 functions as the filter section 48, executes the filtering FR2 on the weaving signal WS1 or WS1', and generates the weaving signal WS2 (FIG. 6, 11, or 13). In the parameters PR2 of the weaving signal WS2 generated here, a parameter PR1 (e.g., the amplitude A1 or the frequency f1) with a high priority order PO is reproduced as described above.

Then, the processor 30 generates the weaving operation command CM3 based on the weaving signal WS2 as described above, causes the servomotors 28 of the robot 12 to operate in accordance with the weaving operation command CM3, and thereby causes the robot 12 to execute the weaving operation as illustrated in FIG. 3. Along with this, the processor 30 activates the tool 26 and welds the workpiece W.

Referring again to FIG. 7, the processor 30 determines whether the welding work has completed in Step S12. The processor 30 ends the procedure illustrated in FIG. 7 when it is determined that the welding work has completed (i.e., YES) or repeats Step S12 in a case of determination of NO. In this manner, the processor 30 causes the robot 12 to execute the weaving operation during execution of the welding work on the workpiece W.

As described above, the processor 30 functions as the input reception section 52, the signal generation section 44, the parameter acquisition section 54, the condition determination section 56, the parameter adjustment section 58, and the operation acquisition section 60 and generates the signals WS1, WS1', and WS2 for the weaving operation in the present embodiment.

Therefore, the input reception section 52, the parameter acquisition section 54, the signal generation section 44, the condition determination section 56, the parameter adjustment section 58, and the operation acquisition section 60 configure the device 70 (FIG. 2) that generates the signals WS1, WS1', and WS2. The device 70 (the input reception section 52, the parameter acquisition section 54, the signal generation section 44, the condition determination section 56, the parameter adjustment section 58, and the operation acquisition section 60) can be a functional module implemented by a computer program executed by the processor 30.

When the condition determination section 56 determines that the condition CD1 or CD2 is not satisfied, the parameter adjustment section 58 adjusts the parameters PR1 received by the input reception section 52 to satisfy the corresponding condition CD1 or CD2 (Steps S6 and S9) in the device 70. Then, when the parameter adjustment section 58 adjusts the parameters PR1, the signal generation section 44 generates the weaving signal WS1' having the post-adjustment parameters PR1' (Step S11).

With this configuration, it is possible to automatically adjust the parameters PR1 such that the weaving signal WS that satisfies the conditions CD1 and CD2 freely set by the operator can be generated. In this manner, it is possible to cause the robot 12 to execute the weaving operation in an aspect desired by the operator and to simplify the work of teaching the robot 12 the desired weaving operation.

Also, in the device 70, the condition determination section 56 determines that the first condition CD1 is not satisfied (NO in Step S5) when the post-filtering parameters PR2 are different from the parameters PR1, and the parameter adjustment section 58 adjusts the parameters PR1 such that the post-filtering parameters PR2 coincide with the parameters PR1 (Step S6).

With this configuration, it is possible to reproduce the parameter PR1 (e.g., the amplitude A1) input by the operator in the weaving signal WS2 obtained by executing the filtering FR2 on the weaving signal WS1' having the post-adjustment parameters PR1'. In this manner, it is possible to cause the robot 12 to more effectively execute the weaving operation desired by the operator.

Also, in the device 70, the parameter adjustment section 58 adjusts the plurality of parameters PR1 such that a post-filtering parameter PR2 (the amplitude A2) corresponding to a first parameter PR1 (e.g., the amplitude A1) with a high priority order PO coincide with the first parameter PR1 in accordance with the priority order PO among the plurality of parameters PR1 (e.g., the amplitude A1, the frequency f1), and the post-filtering parameter PR2 (the frequency f2) corresponding to a second parameter PR1 (e.g., the frequency f1) with a low priority order PO is allowed to be different from the second parameter PR1 (Step S9).

Then, the input reception section 52 further receives an input of the priority order PO, and the parameter adjustment section 58 adjusts the plurality of parameters PR1 in accordance with the priority order PO received by the input reception section 52. With this configuration, a parameter PR1 with a high priority order PO input by the operator can be reproduced with priority in the weaving signal WS2, and it is thus possible to freely design the weaving operation that the robot 12 is caused to execute by the operator considering the conditions CD1 and CD2. Also, the operator can easily predict the weaving signal WS2 to be generated, and it is thus possible to make it easy to verify behaviors of the robot 12 during the weaving operation.

Additionally, in the device 70, the operation acquisition section 60 acquires the operation state parameters OPR (Step S7), and the condition determination section 56 determines that the second condition CD2 is not satisfied when the operation state parameters OPR acquired by the operation acquisition section 60 exceed the corresponding predetermined allowable values (NO in Step S8). In this case, the parameter adjustment section 58 adjusts the parameter PR1 such that none of the operation state parameters OPR exceeds the allowable values (Step S9).

With this configuration, it is possible to prevent the robot 12 from being brought into an inappropriate operation state (e.g., a state where the speed, the acceleration, or the jerk becomes excessively high) during the weaving operation, thereby to prevent an excessive load from being applied to the robot 12, and to prevent the robot 12 from breaking. Additionally, it is possible to prevent degradation of welding quality for the workpiece W caused by the robot 12 executing the weaving operation in an inappropriate operation state.

Note that when the operator inputs the amplitude A1, the frequency f1, and the end-point stop time $t_s$ (>0) in Step S1, the frequency f of the weaving signal WS1 is changed from the frequency f1 input by the operator to the frequency f3 as described above with reference to FIG. 8.

Figure 14:
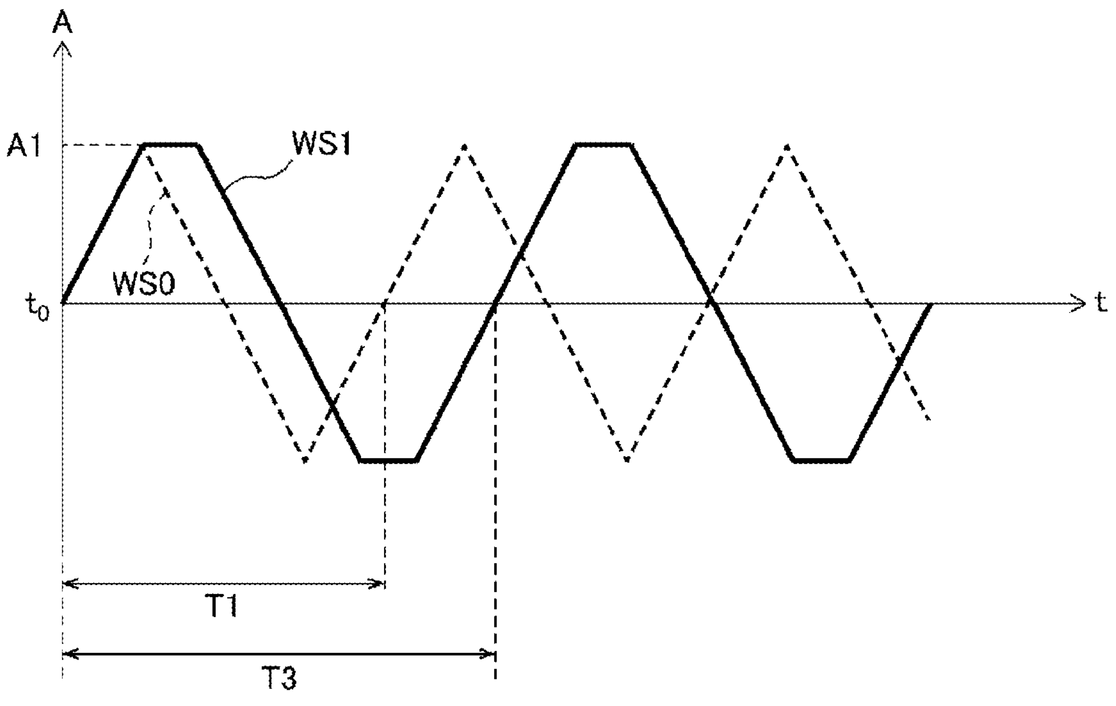
FIG. 14 illustrates a waveform of a weaving signal for which an end-point stop time has been set.

FIG. 14 illustrates a signal WS0 as a triangular wave having the amplitude A1, the frequency f1, and the end-point stop time $t_s$=0 and a weaving signal WS1 having the amplitude A1, the frequency f3 (=1/T3), and the end-point stop time $t_s$ (>0). Once the processor 30 receives an input of the end-point stop time $t_s$ in Step S1, the processor 30 stores the frequency f3 as a parameter setting value PR1v of the parameters PR1 in the memory 32.

Then, the processor 30 acquires the frequency f3 as a post-filtering parameter PR2 in Step S4 described above. Thus, the processor 30 makes determination of NO in Step S5 since the frequency f3 as the post-filtering parameter PR2 is different from the frequency f1 received in Step S1.

In this case, if it is assumed that the operator inputs the priority order PO requiring that the frequency f1 be reproduced with priority in Step S1, the processor 30 adjusts the parameters PR1 to change the frequency f3 set as the parameter setting value PR1v to the frequency f1, the input of which has been received, in Step S6.

Figure 15:
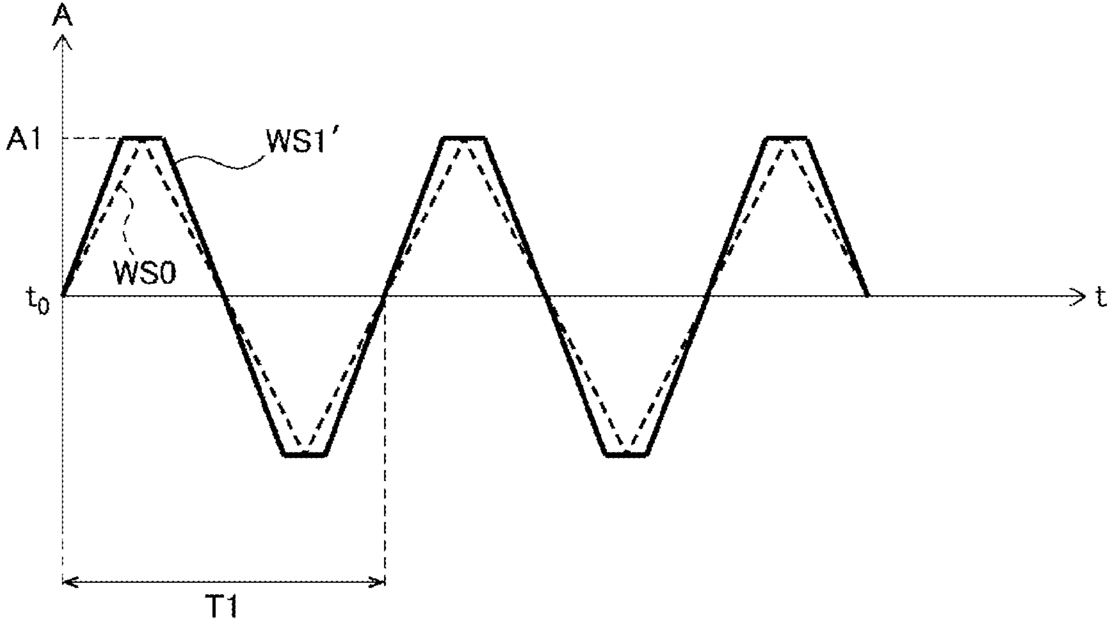
FIG. 15 illustrates a waveform when a frequency has been adjusted as a parameter of the weaving signal illustrated in FIG. 14.

As a result, the weaving signal WS1 generated by the signal generation section 44 is changed to the weaving signal WS1' that is a trapezoidal wave having the frequency f1 as illustrated in FIG. 15. Then, the processor 30 stores the parameters PR1' of the weaving signal WS1' having the frequency f1 as the parameter setting values PR1v in the memory 32.

Note that the operation acquisition section 60 may be omitted from the device 70 and Steps S7 to S9 may be omitted from the procedure illustrated in FIG. 7. In this case, the processor 30 executes Step S10 after Step S6 in the procedure illustrated in FIG. 7. In this procedure, it is assumed that the operator has input the priority order PO requiring that the amplitude A1 be reproduced with priority in Step S1. In this case, the processor 30 may adjust the parameters PR1 to increase the end-point stop time $t_s$ by the method described above with reference to FIG. 12 in Step S6.

Figure 16:
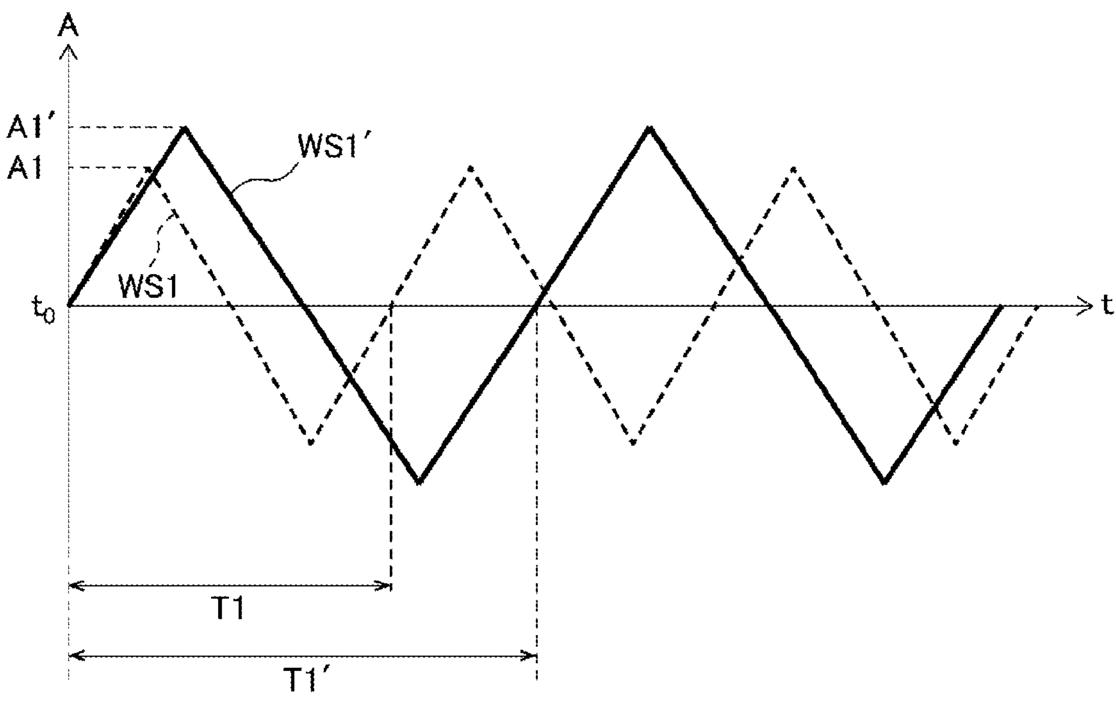
FIG. 16 illustrates a waveform when an amplitude and a frequency have been adjusted as parameters of a weaving signal.

Alternatively, the processor 30 may adjust the parameters PR1 to change both the amplitude A1 and the frequency f1 in Step S6. Such a method for adjusting the parameters will be described with reference to FIG. 16. FIG. 16 illustrates the weaving signal WS1 having the amplitude A1, the frequency f1 (=1/T1), the phase φ1 (=0), and the end-point stop time $t_s$ (=0) as the parameters PR1 received by the processor 30 in Step S1.

When such parameters PR1 have been received, the processor 30 adjusts the parameters PR1 to increase the amplitude A1 to the amplitude A1' while lowering the frequency f1 to the frequency f1' (=1/T1'<f1) in Step S6. As a result, the signal generation section 44 generates the weaving signal WS1' having the post-adjustment parameters PR1' (the amplitude A1', the frequency f1', the phase φ1=0, and the end-point stop time $t_s$=0) as illustrated in FIG. 16.

Figure 17:
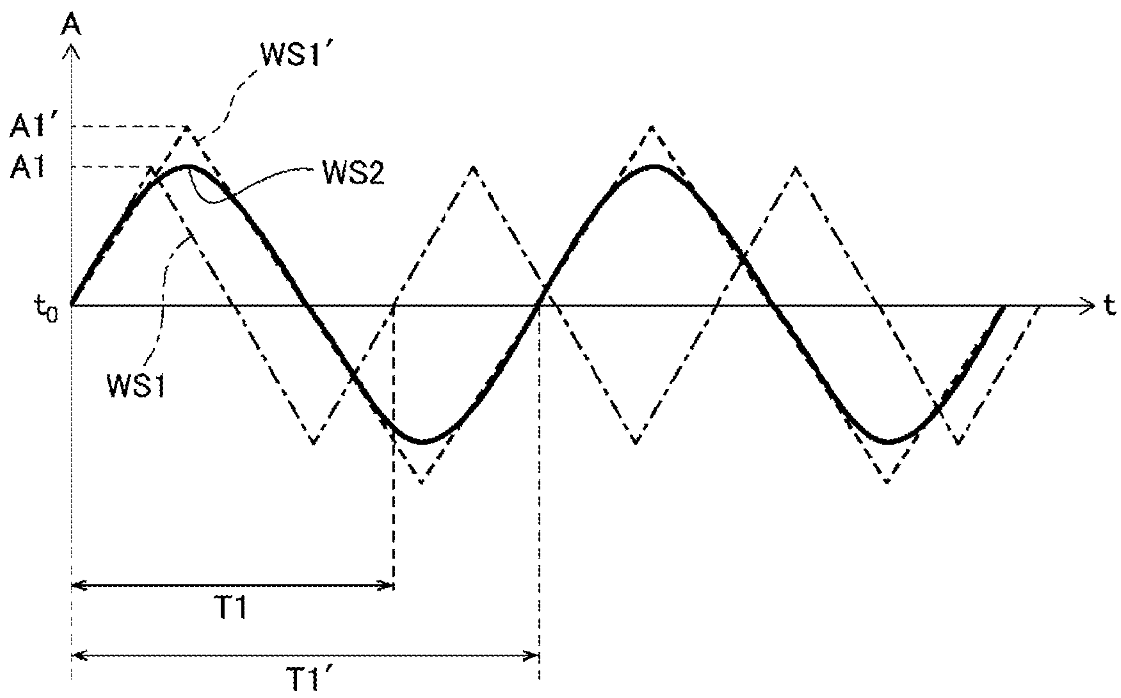
FIG. 17 illustrates a waveform when filtering has been executed on the weaving signal after the parameter adjustment illustrated in FIG. 16.

FIG. 17 illustrates the weaving signal WS2 obtained when the filtering FR2 is executed on the weaving signal WS1' illustrated in FIG. 16. In the post-filtering parameters PR2 of the weaving signal WS2, the amplitude A2 coincides with the amplitude A1 received in Step S1, while the frequency f2 (=f1') is different from the frequency f1 received in Step S1.

In such a method for adjusting the parameters, the processor 30 may decide the change amount by which the amplitude A1 and the frequency f1 are changed in Step S6 such that the post-filtering parameters PR2 satisfy the second condition CD2. For example, the processor 30 may decide the change amount by using the aforementioned data table DT.

Note that if the operator inputs the priority order PO requiring that the frequency f1 be reproduced with priority in Step S1 when Steps S7 to S9 are omitted in the procedure illustrated in FIG. 7, then the processor 30 may not adjust the parameters PR1 in Step S6.

Specifically, if the filtering FR2 is executed on the weaving signal WS1, then the amplitude A1 attenuates while the frequency f1 is maintained as illustrated in FIG. 6. Therefore, the processor 30 can reproduce the frequency f1 with a high priority order PO without adjusting the parameters PR1 in Step S6.

Next, another aspect of the method executed by the processor 30 (the device 70) to generate the weaving signal WS will be described with reference to FIG. 18. Note that the same step numbers will be applied to processes in the procedure illustrated in FIG. 18 similar to those in the procedure illustrated in FIG. 7 and repeated description will be omitted. Hereinafter, a case where the processor 30 has received an input of a priority order PO requiring that the amplitude A1 is to be reproduced with priority in Step S1 will be described. In the present embodiment, the processor 30 makes determination of NO in Step S5 or S8 and subsequently executes Step S6'.

In Step S6', the processor 30 functions as the parameter adjustment section 58 and adjusts the parameters PR1 or PR1' set as the parameter setting values PR1v at this time point to satisfy the conditions CD1 and CD2. When Step S6' is executed after determination of NO in Step S5, for example, the processor 30 increases the amplitude A1 received in Step S1 to the amplitude A1' similarly to Step S6 described above.

On the other hand, when Step S6' is executed after determination of NO in Step S8, the processor 30 sets the end-point stop time $t_s$ illustrated in FIG. 12 (i.e., the frequency f1 or f1' is changed), or both the amplitude A1 or A1' and the frequency f1 or f1' are changed as described above with reference to FIG. 16.

Here, when Step S6' is executed after determination of NO in Step S8, the processor 30 may decide the change amount by which the parameters PR1 or PR1' are changed to satisfy the second condition CD2 by using the aforementioned data table DT, for example. Alternatively, the processor 30 may randomly change the parameters PR1 or PR1' (e.g., the frequency f1 or f1') with a low priority order PO every time Step S6' is executed.

The processor 30 executes Step S6', then returns to Step S3, and repeatedly executes the loop of Steps S3 to S5, S6', S7, and S8 until YES determination is made in Step S8. In this manner, the processor 30 can automatically search for the parameters PR1' that can satisfy the conditions CD1 and CD2 in accordance with the priority order PO.

Figure 18:
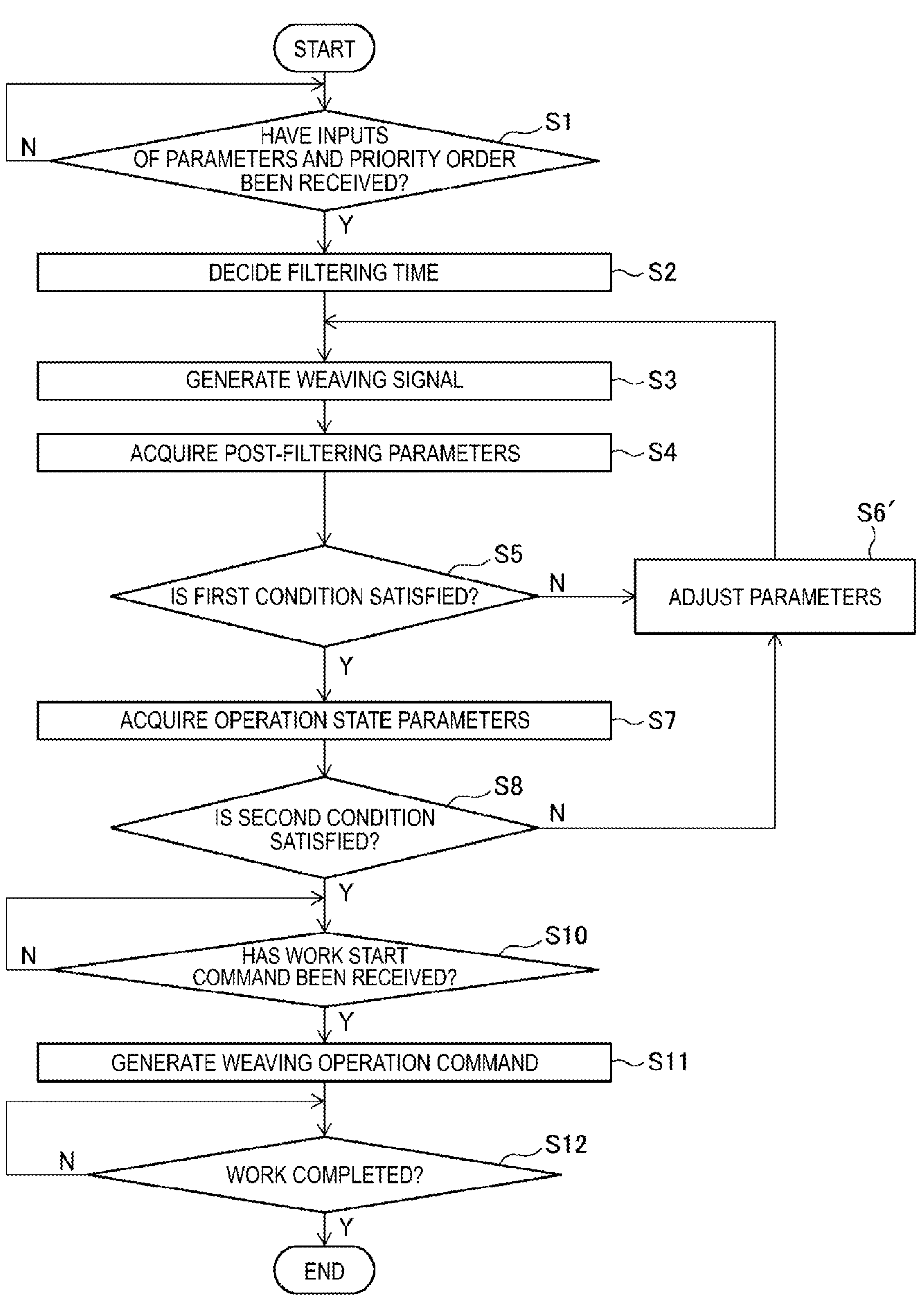
FIG. 18 is a flowchart illustrating another example of a method for generating a weaving signal.

Note that in the procedure illustrated in FIG. 18, the processor 30 may determine whether the first condition CD1 is satisfied in regard only to a parameter PR1 (e.g., the amplitude A1) with a high priority order PO (i.e., the first place) received in Step S1 in Step S5.

Alternatively, the processor 30 may determine whether the first condition CD1 is satisfied in regard to all the parameters PR1 received in Step S1 in Step S5 executed for the first time, and may determine whether the first condition CD1 is satisfied in regard only to a parameter PR1 (e.g., the amplitude A1) with a high priority order PO received in Step S1 in n-th (n is an integer that is equal to or greater than two) executed Step S5.

According to the present embodiment, the processor 30 automatically searches for the optimal parameters PR1', and it is thus possible to effectively design a weaving operation that matches an aspect desired by the operator and to simplify the work of teaching the robot 12 such a weaving operation.

Note that the case where the phase φ1 does not change through the filtering FR2 has been described in the aforementioned embodiment. However, the phase φ1 may change depending on the type of the filtering FR2. When an input of the priority order PO requiring that the phase φ1 be reproduced with priority is received in Step S1 in such a situation, the processor 30 adjusts the parameters PR1 or PR1' to reproduce the phase φ1 in Step S6, S6', or S9 described above.

Figure 19:
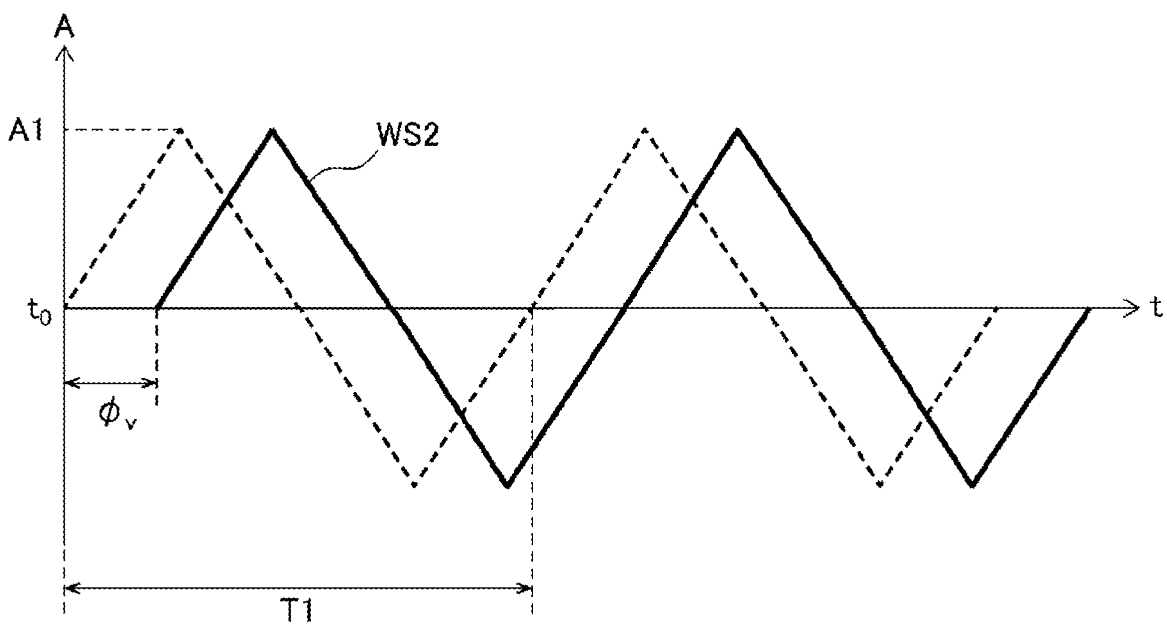
FIG. 19 illustrates a waveform with a phase changed through execution of filtering on a weaving signal.

Hereinafter, a method for reproducing the phase φ1 will be described with reference to FIGS. 19 to 21. In FIG. 19, the weaving signal WS1 having, as the parameters PR1, the amplitude A1, the frequency f1 (=1/T1), and the phase φ1 (=0) is illustrated by the dotted line. On the other hand, the weaving signal WS2 obtained by executing the filtering FR2 on the weaving signal WS1 is illustrated by the solid line. In the example illustrated in FIG. 19, the phase φ2 of the weaving signal WS2 is delayed by the phase $\varphi_v$ with respect to the phase φ1 of the weaving signal WS1 (i.e., $\varphi 2=\varphi 1-\varphi_v$).

Figure 20:
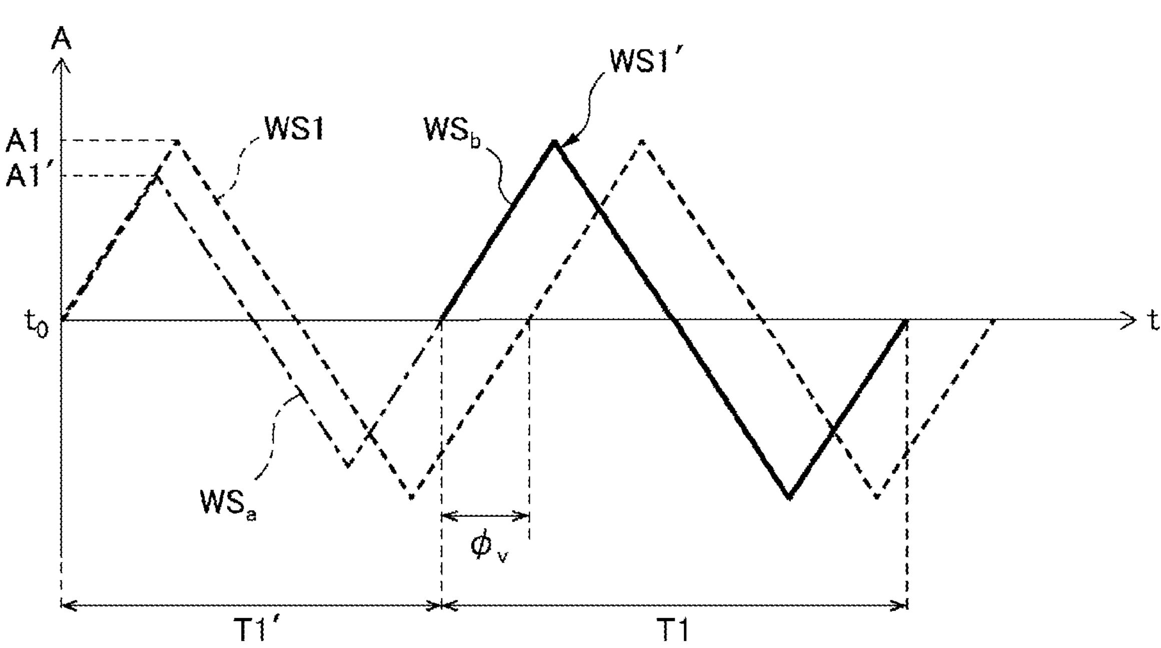
FIG. 20 illustrates a waveform of a weaving signal when an amplitude of a waveform at a part has been adjusted and a frequency of a waveform at another part has been thereby adjusted as a parameter of the weaving signal.

In such a case, the processor 30 adjusts the parameters PR1 to generate the weaving signal WS1' illustrated in FIG. 20 to reproduce the phase φ1 with a high priority order PO. The weaving signal WS1' illustrated in FIG. 20 includes a waveform $WS_a$ of the first wavelength illustrated by the one-dotted chain line and a waveform $WS_b$ of the second and following wavelengths illustrated by the solid line.

The waveform $WS_a$ of the weaving signal WS1' is obtained by reducing the amplitude A1 of the waveform of the first wavelength of the weaving signal WS1 to the amplitude A1 ' while maintaining an inclination of the waveform. On the other hand, the waveform $WS_b$ of the weaving signal WS1' has the same amplitude A1 as that of the waveform of the second and following wavelengths of the weaving signal WS1. With the waveform $WS_a$ having the thus reduced amplitude A1', the phase φ1' of the waveform $WS_b$ advances by the phase $\varphi_v$ with respect to the original weaving signal WS1 (i.e., $\varphi 1'=\varphi 1+\varphi_v$).

The processor 30 adjusts the parameters PR1 of the original weaving signal WS1 to the parameters PR1' (the amplitude A1' and the phase φ1') of the weaving signal WS1' to generate the weaving signal WS1' illustrated in FIG. 20. Note that the change amount by which the amplitude A1 is changed to the amplitude A1' is set as a value with which the phase φ1' of the waveform $WS_b$ becomes $\varphi 1'=\varphi 1+\varphi_v$. The processor 30 stores the post-adjustment parameters PR1' (A1', φ1') as the parameter setting values PR1v in the memory 32.

Figure 21:
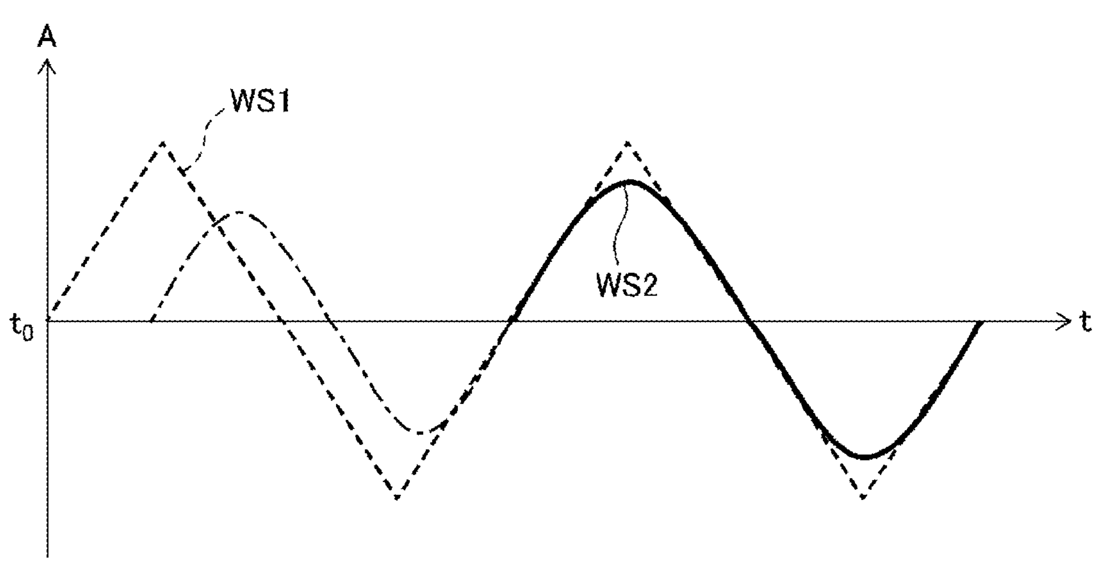
FIG. 21 illustrates a waveform when filtering has been executed on the weaving signal after the parameter adjustment illustrated in FIG. 20.

FIG. 21 illustrates the weaving signal WS2 obtained by executing the filtering FR2 on the weaving signal WS1' illustrated in FIG. 20. Note that the waveform of the weaving signal WS2 of the first wavelength corresponding to the waveform $WS_a$ is illustrated by the one-dotted chain line, while the waveform of the weaving signal WS2 of the second and following wavelengths corresponding to the waveform $WS_b$ is illustrated by the solid line in FIG. 21.

As illustrated in FIG. 21, the phase φ2 of the weaving signal WS2 coincides with the phase φ1 of the weaving signal WS1 received in Step S1 in the waveform of the second and following wavelengths. The processor 30 can reproduce the phase φ1 by adjusting the parameters PR1 in this manner.

Note that the processor 30 may cause the tool 26 to swing in the up-down direction in synchronization with the swinging of the tool 26 in the front-back direction in the weaving operation. Such a weaving operation will be described with reference to FIGS. 3 and 22. In the example illustrated in FIG. 22, the processor 30 executes the weaving operation to displace the tool 26 upward by the distance δ at the position on the moving path WP while causing the tool 26 to swing in the front-back direction between the end point P1 and the end point P2 and to cause the tool 26 to contact the surface of the workpiece W at the positions of the end point P1 and the end point P2.

Figure 22:
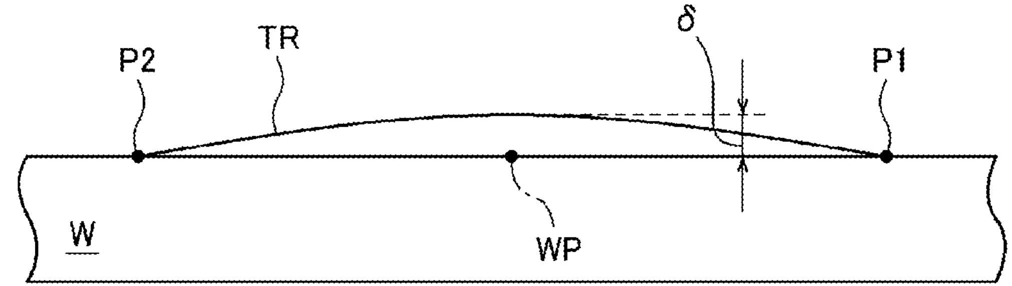
FIG. 22 illustrates another example of a trajectory of a weaving operation.
Figure 22:
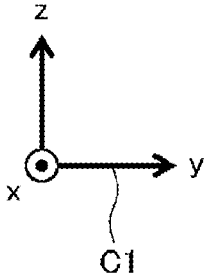
Figure 23:
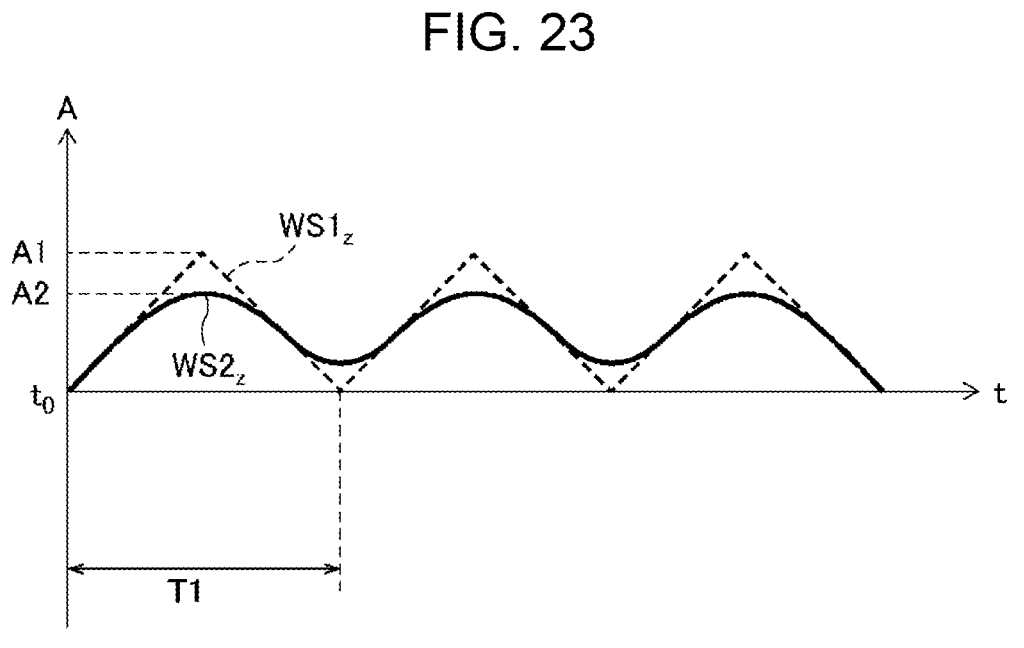

A weaving signal $WS1_z$ for causing the robot 12 to execute the swinging operation in the up-down direction as illustrated in FIG. 22 is illustrated in FIG. 23. Note that the vertical axis in FIG. 23 represents the amplitude A by which the tool 26 is caused to swing in the up-down direction, and the horizontal axis represents the time t. The weaving signal $WS1_z$ illustrated in FIG. 23 has, as parameters PR1, a positive amplitude A1, a frequency f1 (=1/T1), a phase φ1 (=0), and an end-point stop time $t_s$ (=0).

A weaving signal $WS2_z$ obtained by executing the filtering FR2 on the weaving signal $WS1_z$ can have an amplitude A2 (<A1) as a parameter PR2. The parameters PR1 of the weaving signal $WS1_z$ illustrated in FIG. 23 can also be adjusted by a method similar to that in the aforementioned method.

Then, the processor 30 functions as the signal generation section 44 in Step S11 described above, generates the aforementioned weaving signal WS1 and the weaving signal $WS1_z$ illustrated in FIG. 23, generates a synthesized weaving signal $WS1_S$ by adding the weaving signals WS1 and $WS1_z$, and outputs the synthesized weaving signal $WS1_S$ to the filter section 48.

As in the present embodiment, it is possible to improve welding quality by executing the weaving operation of swinging the tool 26 in the up-down direction in synchronization with the swinging of the tool 26 in the front-back direction. Additionally, it is possible to reproduce the parameters PR1 of the weaving signals WS1 and $WS1_z$ desired by the operator and thereby to freely design the weaving operation of causing swinging in the front-back and up-down directions.

Note that the processor 30 may use the aforementioned unique filtering time $\tau_a$ as the filtering time τ1 of the filtering FR1. Also, the processor 30 may uniquely decide the filtering time τ2 as the unique filtering time $\tau_a$ (or an allowable filtering time $\tau_b$) in Step S2 described above.

Also, Step S2 may omitted from the procedure illustrated in FIG. 7 or 18. In this case, the operator may input the desired filtering time τ2 by operating the input device 38. Then, the processor 30 may execute the filtering FR2 in the filtering time τ2, the input of which has been received. In this case, the processor 30 may output an alarm when the filtering time τ2 received from the operator is shorter than the unique filtering time $\tau_a$.

Note that the case where the processor 30 receives an input of the priority order PO in Step S1 has been described in the aforementioned embodiment. However, the present disclosure is not limited thereto, and data of the priority order PO may be predetermined and stored in the memory 32. Also, the priority order PO may not be set. For example, the processor 30 may adjust all the parameters PR1 such that the post-filtering parameters PR2 corresponding to all the parameters PR1 are allowed to be different from the original parameters PR1 to satisfy the second condition CD2 in Step S6' or S9 described above.

Also, the processor 30 may receive an input of the type (a triangular wave, a trapezoidal wave, a sawtooth wave, a triangular function, or the like) of the waveform of the weaving signal WS1 in Step S1. Moreover, the configuration for generating the weaving operation command CM3 is not limited to the mode illustrated in FIG. 4. For example, the filter section 46 may be omitted, and the filter section 48 may be provided in a later stage of the weaving operation command generation section 50.

In this case, the main operation command CM1 generated by the main operation command generation section 42 and the weaving signals WS1 and WS' generated by the signal generation section 44 are added by the weaving operation command generation section 50, and the weaving operation command CM3 is thereby generated. Then, the filter section 48 executes the filtering FR2 on the weaving operation command CM3 generated by the weaving operation command generation section 50, and the result is output to the servomotors 28.

Also, the case where the functions of the device 70 are mounted on the control device 14 has been described in the aforementioned embodiment. However, the present disclosure is not limited thereto, and the functions of the device 70 may be mounted on a different computer (a teaching pendant, a tablet-type PC, a desktop-type PC, or the like) communicably connected to the control device 14. In this case, a processor of the different computer functions as the device 70. Then, the processor of the different computer may function as the signal generation section 44, generate the weaving signals WS1 and WS1', and transmit the weaving signals WS1 and WS1' to the control device 14.

Also, the case where the tool 26 is a welding torch and executes a welding work on the workpiece W has been described in the aforementioned embodiment. However, the present disclosure is not limited thereto, and the tool 26 may be configured to cause a brazing material fed from a brazing material feeding device (not illustrated), for example, to melt and execute a brazing work on the workpiece W or may be configured to execute any work on the workpiece W.

Also, the robot 12 is not limited to the vertical articulated robot and may be any type of robots capable of moving the tool 26, such as a horizontal articulated robot or a parallel link robot. Although the present disclosure has been described above through the embodiments, the above embodiments are not intended to limit the invention as set forth in the claims.

REFERENCE SIGNS LIST

- 10 ROBOT SYSTEM
- 12 ROBOT
- 14 CONTROL DEVICE
- 26 TOOL
- 30 PROCESSOR
- 42 MAIN OPERATION COMMAND GENERATION SECTION
- 44 SIGNAL GENERATION SECTION
- 46, 48 FILTER SECTION
- 50 WEAVING OPERATION COMMAND GENERATION SECTION
- 52 INPUT RECEPTION SECTION
- 54 PARAMETER ACQUISITION SECTION
- 56 CONDITION DETERMINATION SECTION
- 58 PARAMETER ADJUSTMENT SECTION
- 60 OPERATION ACQUISITION SECTION

The invention claimed is:

1. A device configured to generate a signal for a weaving operation of causing a robot to move a tool along a predetermined working path while swinging the tool in a direction intersecting the working path, the device comprising:

an input reception section configured to receive an input of a parameter of a weaving signal for causing the robot to swing the tool;

a signal generation section configured to generate a first weaving signal having the parameter received by the input reception section;

a parameter acquisition section configured to acquire, as a post-filtering parameter, the parameter of the first weaving signal obtained when filtering for removing a high-frequency component is executed on the first weaving signal generated by the signal generation section;

a condition determination section configured to determine whether the post-filtering parameter satisfies a predetermined condition; and a parameter adjustment section configured to adjust the parameter received by the input reception section such that the condition is satisfied, when the condition determination section determines that the condition is not satisfied, wherein the perimeter acquisition section is configured to acquire the post-filtering parameter when the filtering is executed on the first weaving signal having the parameter before the adjustment by the parameter adjustment section, and wherein the signal generation section is configured to generate a second weaving signal having the parameter adjusted by the parameter adjustment section.

2. The device according to claim 1, wherein the condition determination section determines that the condition is not satisfied when the post-filtering parameter is different from the parameter received by the input reception section, and wherein the parameter adjustment section is configured to adjust the parameter received by the input reception section to enable the post-filtering parameter to coincide with the parameter received by the input reception section.

3. The device according to claim 2, wherein the parameter adjustment section is configured to adjust a plurality of the parameters received by the input reception section, in accordance with a priority order of the plurality of parameters, such that:

the post-filtering parameter corresponding to a first parameter with a high priority order of the plurality of parameters coincides with the first parameter; while the post-filtering parameter corresponding to a second parameter with a lower priority order than the first parameter of the plurality of parameters is allowed to be different from the second parameter.

4. The device according to claim 3, wherein the input reception section is configured to further receive an input of the priority order, and wherein the parameter adjustment section is configured to adjust the plurality of parameters in accordance with the priority order received by the input reception section.

5. The device according to claim 1, further comprising an operation acquisition section configured to acquire an operation state parameter representing an operation state of the robot when the robot is caused to execute the weaving operation in accordance with the weaving signal having the post-filtering parameter, wherein the condition determination section determines that the condition is not satisfied when the operation state parameter acquired by the operation acquisition section exceeds a predetermined allowable value, and wherein the parameter adjustment section is configured to adjust the parameter such that the operation state parameter does not exceed the predetermined allowable value.

6. The device according to claim 5, wherein the operation state parameter includes at least one of a speed, an acceleration, and a jerk of the robot.

7. The device according to claim 1, wherein the parameter includes at least one of an amplitude of the weaving signal, a frequency of the weaving signal, a phase of the weaving signal, and an end-point stop time defining a time for maintaining the tool at an end point of a swinging operation of the tool in the weaving operation.

8. A control device comprising the device according to claim 1, and configured to control the robot to execute the weaving operation.

9. The control device according to claim 8, further comprising:

a main operation command generation section configured to generate a main operation command for causing the robot to move the tool in a direction of the working path;

a filter section configured to execute the filtering on the weaving signal generated by the signal generation section; and a weaving operation command generation section configured to generate a weaving operation command for causing the robot to execute the weaving operation by applying the weaving signal, on which the filter section executes the filtering, to the main operation command.

10. A method of generating a signal for a weaving operation of causing a robot to move a tool along a predetermined working path while swinging the tool in a direction intersecting the working path, the method comprising:

receiving, by a processor, an input parameter of a weaving signal for causing the robot to swing the tool;

generating, by the processor, a first weaving signal having the received parameter;

acquiring, by the processor, the parameter of the first weaving signal obtained when filtering for removing a high-frequency component is executed on the generated first weaving signal, as a post-filtering parameter;

determining, by the processor, whether the post-filtering parameter satisfies a predetermined condition;

adjusting, by the processor, the received parameter such that the condition is satisfied, when it is determined that the condition is not satisfied, wherein the post-filtering parameter is acquired when the filtering is executed on the first weaving signal having the parameter before the adjusting the received parameter of the weaving signal; and generating, by the processor, a second weaving signal having the adjusted parameter.

* * * * *